(12) United States Patent
Ahn et al.

(10) Patent No.: US 12,522,808 B2
(45) Date of Patent: Jan. 13, 2026

(54) MODIFIED POLYPEPTIDE WITH ATTENUATED ACTIVITY OF CITRATE SYNTHASE AND METHOD FOR PRODUCING L-AMINO ACID USING THE SAME

(71) Applicant: CJ CHEILJEDANG CORPORATION, Seoul (KR)

(72) Inventors: Chan Hong Ahn, Seoul (KR); Ju Eun Kim, Seoul (KR); Hyun-jung Bae, Seoul (KR); Imsang Lee, Seoul (KR); Ji Hye Lee, Seoul (KR); Hayun Lee, Seoul (KR)

(73) Assignee: CJ CHIELJEDANG CORPORATION, Seoul (KR)

( * ) Notice: Subject to any disclaimer, the term of this patent is extended or adjusted under 35 U.S.C. 154(b) by 597 days.

(21) Appl. No.: 17/779,909

(22) PCT Filed: Aug. 4, 2020

(86) PCT No.: PCT/KR2020/010243
§ 371 (c)(1),
(2) Date: May 25, 2022

(87) PCT Pub. No.: WO2021/153866
PCT Pub. Date: Aug. 5, 2021

(65) Prior Publication Data
US 2023/0040524 A1    Feb. 9, 2023

(30) Foreign Application Priority Data

Jan. 30, 2020  (KR) ........................ 10-2020-0010823

(51) Int. Cl.
| | |
|---|---|
| *C12N 9/10* | (2006.01) |
| *C12N 15/77* | (2006.01) |
| *C12P 13/06* | (2006.01) |
| *C12P 13/08* | (2006.01) |
| *C12P 13/12* | (2006.01) |
| *C12R 1/15* | (2006.01) |

(52) U.S. Cl.
CPC ........... *C12N 9/1025* (2013.01); *C12N 15/77* (2013.01); *C12P 13/06* (2013.01); *C12Y 203/03003* (2013.01); *C12R 2001/15* (2021.05)

(58) Field of Classification Search
CPC ....... C12N 9/1025; C12N 15/77; C12P 13/06; C12P 13/08; C12P 13/12; C12Y 203/03003; C12Y 203/03001; C12R 2001/15
See application file for complete search history.

(56) References Cited

U.S. PATENT DOCUMENTS

| | | | |
|---|---|---|---|
| 8,048,650 B2 | 11/2011 | Koo et al. | |
| 8,465,962 B2 | 6/2013 | Kim et al. | |
| 9,109,242 B2 | 8/2015 | Park et al. | |
| 10,662,450 B2 | 5/2020 | Kim et al. | |
| 2007/0122887 A1 | 5/2007 | Klopprogge et al. | |
| 2009/0280542 A1 | 11/2009 | Bathe et al. | |
| 2010/0261257 A1 | 10/2010 | Bathe et al. | |
| 2012/0214211 A1 | 8/2012 | Bathe et al. | |
| 2016/0355830 A1 | 12/2016 | Moon et al. | |

FOREIGN PATENT DOCUMENTS

| | | |
|---|---|---|
| EP | 2 998 338 A1 | 3/2016 |
| KR | 1992-0007401 B1 | 1/1992 |
| KR | 10-0073610 B1 | 2/1994 |
| KR | 10-2008-0025355 A | 3/2008 |
| KR | 2009-0094433 A | 9/2009 |
| KR | 10-0924065 B1 | 10/2009 |
| KR | 10-1335789 B1 | 12/2013 |
| KR | 10-1641770 A | 7/2016 |
| KR | 10-1915433 B1 | 11/2018 |
| KR | 10-2019-0003019 A | 1/2019 |
| KR | 10-2011994 B1 | 8/2019 |

OTHER PUBLICATIONS

GenBank Accession No. AAB35835.1 (Mar. 14, 2000, 2 pages) (Year: 2000).*
UniProt Accession No. A0A0A2DM89_9CORY (2 pages, Dec. 11, 2019) (Year: 2019).*
UniProt Accession No. A0A160PN33_CORGT (2 pages, Dec. 11, 2019) (Year: 2019).*
Machine translation of Korean Patent No. KR 10-2011994 (14 pages) (Year: 2025).*
Singh et al. (Curr Protein Pept Sci, 2017, 18:1) (Year: 2017).*
Zhang et al. (Structure, 2018, 26:1474) (Year: 2018).*
Accession P42457, 2 pages (Nov. 1, 1995).
Baumgart et al., "Deletion of the Aconitase Gene in *Corynebacterium glutamicum* Causes Strong Selection Pressure for Secondary Mutations Inactivating Citrate Synthase," *Journal of Bacteriology* 193(24):6864-6873 (Dec. 2011).
Binder et al., "A high-throughput approach to identify genomic variants of bacterial metabolite producers at the single-cell level," *Genome Biology* 13:R340 (12 pages) (2012).
Chica et al., "Semi-rational approaches to engineering enzyme activity: combining the benefits of directed evolution and rational design," *Current Opinion in Biotechnology* 16:378-384 (2005).
Eikmanns et al., Nucleotide sequence, expression and transcriptional analysis of the *Corynebacterium glutamicum* gltA gene encoding citrate synthase, *Microbiology* 140:1817-1828 (1994).
Li et al., "Recent Advances in Engineering Proteins for Biocatalysis," *Biotechnol. Bioeng.* 111:1273-1287 (2014).
Morbach et al., "Use of Feedback-Resistant Threonine Dehydratases of *Corynebacterium glutamicum* To Increase Carbon Flux towards $_L$-Isoleucine," *Applied and Environmental Microbiology* 61(12):4315-4320 (1995).

(Continued)

*Primary Examiner* — David Steadman
*Assistant Examiner* — Joseph R Spangler
(74) *Attorney, Agent, or Firm* — Seed Intellectual Property Law Group LLP

(57) ABSTRACT

The present disclosure relates to a modified polypeptide with attenuated activity of citrate synthase, a microorganism producing leucine comprising the modified polypeptide, and a method for producing an L-amino acid using the microorganism.

11 Claims, No Drawings
Specification includes a Sequence Listing.

(56) References Cited

OTHER PUBLICATIONS

Morbach et al., "$_L$-Isoleucine Production with *Corynebacterium glutamicum*: Further Flux Increase and Limitation of Export," *Applied and Environmental Microbiology* 62(12):4345-4351 (Dec. 1996).

Morbach et al., "Engineering the homoserine dehydrogenase and threonine dehydratase control points to analyse flux toward $_L$-isoleucine in *Corynebacterium glutamicum*," *Appl Microbiol Biotechnol* 45:612-620 (1996).

Quandt et al., "Fine-tuning citrate synthase flux potentiates and refines metabolic innovation in the Lenski evolution experiment," *eLife* 4:e09696, 22 pages (2015).

Singh et al., "Protein Engineering Approaches in the Post-Genomic Era," *Current Protein and Peptide Science* 18:1-11 (2017).

Van Der Rest et al., "A heat shock following electroporation induces highly efficient transformation of *Corynebacterium glutamicum* with xenogeneic plasmic DNA," *Appl Microbiol Biotechnol* 52:541-545 (1999).

Van Ooyen et al., "Improved $_L$-Lysine Production With *Corynebacterium glutamicum* and Systemic Insight into Citrate Synthase Flux and Activity," *Biotechnology and Bioengineering* (12 pages) (2012).

Zhou et al., "Exploring Lysine Riboswitch for Metabolic Flux Control and Improvement of $_L$- Lysine Synthesis in *Corynebacterium glutamicum*," *ACS Synth. Biol.* (six pages) (Aug. 3, 2014).

Ma et al., "Identification and application of a growth-regulated promoter for improving L-valine production in *Corynebacterium glutamicum*," *Microb Cell Fact* 17:185, 10 pages (2018).

Yokota et al., "Effects of Reduced Citrate Synthase Activity and Feedback-resistant Phosphoenolpyruvate Carboxylase on Lysine Productivities of *Brevibacterium flavum* Mutants," *Agric. Biol. Chem.*, 52(2):455-463 (1998).

U.S. Appl. No. 16/470,030, filed Jun. 14, 2019.

* cited by examiner

MODIFIED POLYPEPTIDE WITH ATTENUATED ACTIVITY OF CITRATE SYNTHASE AND METHOD FOR PRODUCING L-AMINO ACID USING THE SAME

STATEMENT REGARDING THE SEQUENCE LISTING

The Sequence Listing associated with this application is provided in text format in lieu of a paper copy, and is hereby incorporated by reference into the specification. The name of the text file containing the Sequence Listing is 200187_485USPC_SEQUENCE LISTING.txt. The text file is 21,833 bytes, was created on May 31, 2022, and is being submitted electronically via EFS-Web.

TECHNICAL FIELD

The present disclosure relates to a novel modified polypeptide with attenuated activity of citrate synthase, a microorganism including the modified polypeptide, and a method for producing L-amino acids using the microorganism.

BACKGROUND ART

A microorganism of the genus *Corynebacterium*, specifically *Corynebacterium glutamicum*, is a gram-positive microorganism that is widely used in the production of L-amino acids and other useful materials. For production of the L-amino acids and other useful materials, various studies are underway to develop microorganisms with high-efficiency production and technologies for fermentation processes. For example, target material-specific approaches, such as increasing the expression of genes encoding the enzymes involved in L-lysine biosynthesis or removing genes unnecessary for biosynthesis, are mainly used (U.S. Pat. No. 8,048,650 B2).

Meanwhile, among L-amino acids, L-lysine, L-threonine, L-methionine, L-isoleucine, and L-glycine are aspartate-derived amino acids, and the biosynthesis level of oxaloacetate (i.e., a precursor of aspartate) can affect the biosynthesis levels of these L-amino acids.

Citrate synthase (CS) is an enzyme that produces citrate by catalyzing the condensation of acetyl-CoA and oxaloacetate, which are produced during the process of a microorganism, and it is also an important enzyme for determining carbon-flow into the TCA pathway.

The phenotypic changes in L-lysine-producing strains due to the deletion of gltA gene encoding citrate synthase were reported previously in a literature (Ooyen et al., Biotechnol. Bioeng., 109(8): 2070-2081, 2012). However, these strains with the deletion of gltA gene have disadvantages in that not only their growth is inhibited but also the sugar consumption rates are significantly reduced, thus resulting in low lysine production per unit time. Accordingly, there is still a need for studies under which an effective increase in the L-amino acid-producing ability and the growth of strains can be both considered.

DISCLOSURE

Technical Problem

The present inventors have confirmed that when a novel modified polypeptide, in which citrate synthase activity is attenuated to a particular level, is used, the amount of L-amino acids produced is increased, thereby completing the present disclosure.

Technical Solution

One object of the present disclosure provides a modified polypeptide having citrate synthase activity, wherein the amino acid corresponding to the 312th position from the N-terminus of a polypeptide composed of an amino acid sequence of SEQ ID NO: 1 is substituted with another amino acid.

Another object of the present disclosure provides a polynucleotide encoding the modified polypeptide.

Still another object of the present disclosure provides a vector including the polynucleotide.

Still another object of the present disclosure provides a microorganism producing an L-amino acid, including the modified polypeptide, the polynucleotide encoding the modified polypeptide, or the vector including the polynucleotide.

Still another object of the present disclosure provides a method for producing an L-amino acid, including culturing a microorganism including the modified polypeptide, the polynucleotide encoding the modified polypeptide, or the vector including the polynucleotide in a medium.

Advantageous Effects

When the microorganism of the genus *Corynebacterium* producing an L-amino acid, in which the activity of citrate synthase for the substrate is modified, is cultured, an L-amino acid can be produced in high yield as compared to a microorganism having an existing unmodified polypeptide.

DETAILED DESCRIPTION OF PREFERRED EMBODIMENTS

The present disclosure is described in detail as follows. Meanwhile, respective descriptions and embodiments disclosed herein may also be applied to other descriptions and embodiments, respectively. That is, all combinations of various elements disclosed in the present disclosure fall within the scope of the present disclosure. Further, the scope of the present disclosure is not limited by the specific description below.

One aspect of the present disclosure may provide a modified polypeptide having citrate synthase activity, wherein the amino acid corresponding to the 312th position from the N-terminus of a polypeptide composed of an amino acid sequence of SEQ ID NO: 1 is substituted with another amino acid.

In the present disclosure, the amino acid sequence of SEQ ID NO: 1 may refer to an amino acid sequence having the activity of citrate synthase, and specifically may refer to a protein sequence having the activity of citrate synthase encoded by gltA gene. The amino acid sequence of SEQ ID NO: 1 may be obtained from GenBank of NCBI, which is a known database. For example, the amino acid sequence of SEQ ID NO: 1 may be derived from *Corynebacterium glutamicum*, but is not limited thereto, and may include any amino acid sequence of a protein having the same activity as that of the protein including the above amino acid sequence without limitation. Further, the protein having the citrate synthase activity of the present disclosure may be a protein including the amino acid sequence of SEQ ID NO: 1 and may include a mutation that can occur due to a meaningless sequence addition upstream or downstream of the amino acid sequence of the SEQ ID NO, a naturally occurring mutation, or a silent mutation therein, and it is apparent to those skilled in the art that any protein having the same or corresponding activity to the protein including the amino acid sequence of SEQ ID NO: 1 may fall within the protein having the citrate synthase activity of the present disclosure. In a specific example, the protein having the citrate synthase activity of the present disclosure may be a protein including the amino acid sequence of SEQ ID NO: 1 or a protein composed of an amino acid sequence having a homology or identity of 80%, 85%, 90%, 95%, 96%, 97%, 98% or 99% or more to the amino acid sequence of SEQ ID NO: 1. Further, it is apparent that any protein having an amino acid sequence, in which part of the amino acid sequence is deleted, modified, substituted, or added, may also fall within the scope of the protein targeted for modification of the present disclosure as long as the protein has such a homology or identity and exhibits an effect corresponding to that of the above protein.

As used herein, the term "citrate synthase (CS)" refers to an enzyme that produces citrate by catalyzing the condensation of acetyl-CoA and oxaloacetate, which are produced during the glycolysis of a microorganism, and it is an important enzyme that determines carbon-flow into the TCA pathway. Specifically, citrate synthase may act to regulate the rate in the first step of the TCA cycle as an enzyme for synthesizing citrate. Additionally, the citrate synthase catalyzes the condensation reaction of the two-carbon acetate residue from acetyl-CoA and a molecule of 4-carbon oxaloacetate to form the 6-carbon acetate. In the present disclosure, the citrate synthase may be used interchangeably with "enzyme for synthesizing citrate", "CS", "gltA protein", or "gltA".

As used herein, the term "variant" refers to a polypeptide having at least one amino acid sequence different from the recited sequence by conservative substitutions and/or modifications such that functions or properties of the protein are retained. Modified polypeptides differ from a sequence identified by substitution, deletion, or addition of several amino acids. Such variants may generally be identified by modifying one of the above polypeptide sequences and by evaluating properties of the modified polypeptide. That is, the ability of the variants may be enhanced, unchanged, or diminished relative to a native protein. Such variants may generally be identified by modifying one of the above polypeptide sequences and by evaluating the reactivity of the modified polypeptide. Further, some variants may include those in which one or more portions, such as an N-terminal leader sequence or transmembrane domain, have been removed. Other variants may include those in which a portion has been removed from the N- and/or C-terminal of a mature protein.

As used herein, the term "conservative substitution" refers to substitution of an amino acid with another amino acid having similar structural and/or chemical properties. For example, the variant may have at least one conservative substitution while retaining at least one biological activity. Such amino acid substitution may generally occur based on similarity of polarity, charge, solubility, hydrophobicity, hydrophilicity, and/or amphipathic nature of a residue. For example, positively charged (basic) amino acids include arginine, lysine, and histidine; negatively charged (acidic) amino acids include glutamic acid and aspartic acid; aromatic amino acids include phenylalanine, tryptophan, and tyrosine; and hydrophobic amino acids include alanine, valine, isoleucine, leucine, methionine, phenylalanine, proline, glycine, and tryptophan. In general, the conservative substitution has little or no influence on the activity of a produced polypeptide.

Additionally, the variants may also include deletion or addition of amino acids that have minimal influence on the properties and secondary structure of the polypeptide. For example, the polypeptide may be conjugated to a signal (or leader) sequence at the N-terminal of a protein involved in the transfer of proteins co-translationally or post-translationally. Further, the polypeptide may also be conjugated with another sequence or a linker to identify, purify, or synthesize the polypeptide.

As used herein, the "modified polypeptide having citrate synthase activity" refers to a polypeptide having citrate synthase activity which is attenuated as compared to a wild-type by substituting part of the amino acid sequence of the polypeptide having citrate synthase activity. In the present disclosure, it may refer to a modified polypeptide that can effectively establish a balance of carbon flow by modifying at least one amino acid in the amino acid sequence of the polypeptide having citrate synthase activity and thus the activity thereof is attenuated as compared to a wild-type.

Specifically, in various proteins having the citrate synthase activity, the modified polypeptide may be a modified polypeptide in which the amino acid corresponding to the 312th position in the amino acid sequence of SEQ ID NO: 1 is substituted with another amino acid. The "another amino acid" may refer to a different amino acid before substitution, and it can be any amino acid excluding the amino acid before substitution.

More specifically, in various proteins having the citrate synthase activity, the modified polypeptide may be a modified polypeptide in which methionine corresponding to the 312th position in the amino acid sequence of SEQ ID NO: 1 is substituted with another amino acid. The methionine may be substituted with any one or more amino acids selected from the group consisting of alanine, arginine, asparagine, aspartic acid, cysteine, glutamic acid, glutamine, glycine, histidine, isoleucine, leucine, lysine, phenylalanine, proline, serine, threonine, tryptophan, tyrosine, and valine, and much more specifically, it may be a modified sequence substituted with isoleucine, but is not limited thereto.

Additionally, not only natural amino acids but also non-natural amino acids may also be included in the substituted amino acid residues. The non-natural amino acids may be, for example, D-amino acids, homo-amino acids, beta-homo-amino acids, N-methyl amino acids, alpha-methyl amino acids, uncommon amino acids (for example, citrulline, naphthylalanine, etc.), but are not limited thereto. Meanwhile, in the present disclosure, when it is described as "a specific amino acid is substituted", it is apparent that an amino acid other than the amino acid before substitution has been substituted although it does not specify that another amino acid has been substituted.

As used herein, the "corresponding to" refers to an amino acid residue at the position recited in the protein or peptide, or an amino acid residue which is similar, identical, or homologous to the residue recited in the protein or peptide. As used herein, the "corresponding region" generally refers to a similar position in the related protein or reference protein.

In the present disclosure, a specific numbering of amino acid residue positions in the polypeptide used herein may be employed. For example, it is possible to renumber the amino acid residue positions of the polypeptide of the present disclosure to the corresponding positions by aligning the polypeptide sequence of the present disclosure with the target polypeptide to be compared.

The modified polypeptide having citrate synthase activity provided in the present disclosure may have an increased L-amino acid-producing ability as compared to the polypeptide before modification by substitution of an amino acid at a specific position in the citrate synthase described above.

The modified polypeptide may have a sequence homology of 80% or more and less than 100% to the amino acid sequence of SEQ ID NO: 1, but is not limited thereto. Specifically, the modified polypeptide of the present disclosure may have a homology of at least 80%, 90%, 95%, 96%, 97%, 98%, or 99% to the amino acid sequence of SEQ ID NO: 1. Further, it is apparent that, in addition to the amino acid sequence at the 312th position, any protein having an amino acid sequence, in which part of the amino acid sequence is deleted, modified, substituted, or added, may also fall within the scope of the present disclosure as long as the protein has such a homology and exhibits an effect corresponding to that of the above protein.

Additionally, in the present disclosure, although it is described as "a protein or polypeptide having an amino acid sequence of a particular SEQ ID NO", it is apparent that any protein which has deletion, modification, substitution, or addition in part of the amino acid sequence may also be used in the present disclosure, as long as the protein has activity substantially the same as or equivalent to that of the polypeptide consisting of the amino acid sequence of the corresponding SEQ ID NO. For example, in a case where a protein or polypeptide has activity the same as or equivalent to that of the modified polypeptide, a mutation that can occur due to a meaningless sequence addition upstream or downstream of the amino acid sequence of the corresponding SEQ ID NO, a naturally occurring mutation, or a silent mutation therein is not excluded, in addition to the modification at the 312th position which gives particular activity, and it is apparent that a protein or polypeptide having such a sequence addition or mutation also belong to the scope of the present disclosure.

The modified polypeptide, in which the amino acid corresponding to the 312th position in the amino acid sequence of SEQ ID NO: 1 is substituted with another amino acid, may include an amino acid sequence of SEQ ID NO: 3. More specifically, the modified polypeptide, in which methionine corresponding to the 312th position in the amino acid sequence of SEQ ID NO: 1 is substituted with isoleucine, may be composed of the amino acid sequence of SEQ ID NO: 3. Additionally, the modified polypeptide may include an amino acid sequence having a homology of 80% or more and less than 100% to the amino acid sequence of SEQ ID NO: 3, but is not limited thereto. Specifically, the modified polypeptide of the present disclosure may include the amino acid sequence of SEQ ID NO: 3 or a polypeptide having a homology of at least 80%, 90%, 95%, 96%, 97%, 98%, or 99% to the amino acid sequence of SEQ ID NO: 3. Further, it is apparent that any protein having an amino acid sequence, in which part of the amino acid sequence is deleted, modified, substituted, or added, in addition to the amino acid sequence at the 312th position, may also be used in the present disclosure as long as the protein has such a homology and includes an amino acid sequence exhibiting an effect corresponding to that of the above protein.

In the case of a microorganism including the modified polypeptide with attenuated citrate synthase activity for the purpose of the present disclosure, it has a feature in that the yield of an L-amino acid is increased, while having a similar sugar consumption rate as compared to the control. Therefore, it may be interpreted that the amount of L-amino acids produced can be increased by a suitable balance between the carbon flow into the TCA pathway and the supply amount of oxaloacetate used as a precursor of the biosynthesis of an L-amino acid by controlling the activity of citrate synthase.

As used herein, the term "homology" refers to the percent of identity between two polynucleotide or polypeptide moieties. It may also refer to the degree of correspondence to a given amino acid sequence or nucleotide sequence, and may be expressed as a percentage. In the present specification, a homologous sequence having activity which is identical or similar to that of the given amino acid sequence or nucleotide sequence may be indicated in terms of "% homology". The homology between the sequence from one moiety to another can be determined by techniques known in the art. For example, the homology may be confirmed using a standard software for calculating parameters such as score, identity, and similarity, specifically, BLAST 2.0, or by comparing sequences via southern hybridization experiments under defined stringent conditions. The defined appropriate hybridization conditions are within the corresponding skill of the art, and may be determined by a method well known to those skilled in the art (For example, J. Sambrook et al., Molecular Cloning, A Laboratory Manual, 2nd Edition, Cold Spring Harbor Laboratory press, Cold Spring Harbor, New York, 1989; F. M. Ausubel et al., Current Protocols in Molecular Biology, John Wiley & Sons, Inc., New York).

Another aspect of the present disclosure may provide a polynucleotide encoding a modified polypeptide having citrate synthase activity, wherein the amino acid corresponding to the 312th position from the N-terminus of a polypeptide composed of an amino acid sequence of SEQ ID NO: 1 is substituted with another amino acid.

The amino acid sequence of SEQ ID NO: 1, the citrate synthase, and the modified polypeptide are as described above.

As used herein, the term "polynucleotide", which is a polymer of nucleotides composed of nucleotide monomers connected in a lengthy chain by a covalently bond, is a DNA or RNA strand having at least a certain length, and more specifically may refer to a polynucleotide fragment encoding the variant.

The polynucleotide of the present disclosure may include without limitation any polynucleotide sequence encoding the modified polypeptide of the present disclosure, which has citrate synthase activity. In the present disclosure, the gene encoding the amino acid sequence of the citrate synthase may be the gltA gene, and the gene may be derived from *Corynebacterium glutamicum*, but is not limited thereto. Additionally, the gene may be a nucleotide sequence encoding the amino acid sequence of SEQ ID NO: 1, and more specifically, it may be a sequence including the nucleotide sequence of SEQ ID NO: 2, but is not limited thereto.

Specifically, the polynucleotide of the present disclosure may undergo various modifications in the coding region within the scope not changing the amino acid sequence of the polypeptide, due to codon degeneracy or in consideration of the codons preferred in an organism in which the polypeptide is to be expressed. Specifically, any polynucleotide sequence encoding the modified polypeptide, in which the amino acid corresponding to the 312th position in the amino acid sequence of SEQ ID NO: 1 is substituted with another amino acid, may be included without limitation. For example, the modified polypeptide of the present disclosure may be a polynucleotide sequence encoding the amino acid sequence of SEQ ID NO: 3, but is not limited thereto. More specifically, the modified polypeptide of the present disclosure may be those which consist of a polynucleotide sequence of SEQ ID NO: 4, but is not limited thereto.

Additionally, a probe that may be prepared from a known gene sequence, for example, any sequence which can hybridize with a sequence complementary to all or part of the nucleotide sequence under stringent conditions to encode a protein having the citrate synthase activity, in which the amino acid at the 312th position in the amino acid sequence of SEQ ID NO: 1 is substituted with another amino acid, may be included without limitation. The term "stringent conditions" refers to conditions under which specific hybridization between polynucleotides is allowed. Such conditions are specifically described in the literature (e.g., J. Sambrook et al., supra). For example, the stringent conditions may include conditions under which genes having a high homology or identity of 40% or higher, specifically 90% or higher, more specifically 95% or higher, much more specifically 97% or higher, still much more specifically 99% or higher are hybridized with each other and genes having a homology or identity lower than the above homologies or identities are not hybridized with each other, or ordinary washing conditions of Southern hybridization (i.e., washing once, specifically twice or three times at a salt concentration and a temperature corresponding to 60° C., 1×SSC, 0.1% SDS, specifically 60° C., 0.1×SSC, 0.1% SDS, and more specifically 68° C., 0.1×SSC, 0.1% SDS).

Hybridization requires that two nucleic acids contain complementary sequences, although mismatches between bases are possible depending on the stringency of the hybridization. The term "complementary" is used to describe the relationship between nucleotide bases that can hybridize with each other. For example, with respect to DNA, adenosine is complementary to thymine and cytosine is complementary to guanine. Therefore, the present disclosure may include isolated nucleic acid fragments complementary to the entire sequence as well as nucleic acid sequences substantially similar thereto.

Specifically, the polynucleotides having a homology or identity may be detected using the hybridization conditions including a hybridization step at a $T_m$ value of 55° C. under the above-described conditions. Further, the $T_m$ value may be 60° C., 63° C., or 65° C., but is not limited thereto and may be appropriately adjusted by those skilled in the art depending on the purpose thereof.

The appropriate stringency for hybridizing polynucleotides depends on the length of the polynucleotides and the degree of complementation, and these variables are well known in the art (see Sambrook et al., supra, 9.50-9.51, 11.7-11.8).

Still another aspect of the present disclosure may provide a vector including a polynucleotide encoding a modified polypeptide having citrate synthase activity, wherein the amino acid corresponding to the 312th position from the N-terminus of a polypeptide composed of an amino acid sequence of SEQ ID NO: 1 is substituted with another amino acid.

The amino acid sequence of SEQ ID NO: 1, the citrate synthase, the modified polypeptide, and the polynucleotide are as described above.

As used herein, the term "vector" refers to a DNA product containing a nucleotide sequence of a polynucleotide encoding the target polypeptide, which is operably linked to a suitable control sequence to express the target polypeptide in a suitable host. The control sequence may include a promoter capable of initiating transcription, an arbitrary operator sequence for controlling such transcription, a sequence encoding an appropriate mRNA ribosome-binding site, and sequences for controlling the termination of transcription and translation. Once transformed into a suitable host cell, the vector may replicate or function independently of the host genome or may be integrated into the genome itself.

The vector used in the present disclosure is not particularly limited, and any vector known in the art may be used. Examples of the vector conventionally used may include natural or recombinant plasmids, cosmids, viruses, and bacteriophages. For example, as a phage vector or cosmid vector, pWE15, M13, MBL3, MBL4, IXII, ASHII, APII, t10, t11, Charon4A, Charon21A, etc., may be used; and as a plasmid vector, those based on pBR, pUC, pBluescriptII, pGEM, pTZ, pCL, pET, etc., may be used. Specifically, pCR2.1, pDC, pDZ, pACYC177, pACYC184, pCL, pECCG117, pUC19, pBR322, pMW118, pCC1BAC vector, etc., may be used.

The vector that can be used in the present disclosure is not particularly limited, and any known expression vector may be used. Additionally, a polynucleotide encoding a target polypeptide may be inserted into the chromosome using a vector for intracellular chromosomal insertion. The insertion of the polynucleotide into the chromosome may be performed by any method known in the art (e.g., homologous recombination), but the method is not limited thereto. Further, the vector may further include a selection marker to confirm the insertion into the chromosome. The selection marker is for selecting the cells transformed with the vector, that is, for confirming whether the target nucleic acid molecule has been inserted. Markers that provide selectable phenotypes, such as drug resistance, auxotrophy, resistance to cell toxic agents, or expression of surface proteins, may be used. Under the circumstances treated with a selective agent, only the cells expressing the selection marker can survive or express other phenotypic traits, and thus the transformed cells can be selected.

As used herein, the term "transformation" refers to the introduction of a vector including a polynucleotide encoding a target protein into a host cell so that the protein encoded by the polynucleotide can be expressed in a host cell. As long as the transformed polynucleotide can be expressed in the host cell, it does not matter whether the transformed polynucleotide is integrated into the chromosome of the host cell and located therein or located extrachromosomally, and both cases can be included.

Further, the polynucleotide may include DNA and RNA encoding the target protein.

The polynucleotide may be introduced in any form, as long as it can be introduced into the host cell and expressed therein. For example, the polynucleotide may be introduced into the host cell in the form of an expression cassette, which is a gene construct including all elements required for its autonomous expression. The expression cassette may commonly include a promoter operably linked to the polynucleotide, a transcription terminator, a ribosome binding site, or a translation terminator. The expression cassette may be in the form of a self-replicable expression vector. Additionally, the polynucleotide may be introduced into the host cell as it is and operably linked to sequences required for expression in the host cell, but is not limited thereto. The transformation method includes any method of introducing a polynucleotide into a cell, and may be performed by selecting a suitable standard technique known in the art, depending on the host cell. For example, the method may include electroporation, calcium phosphate ($Ca(H_2PO_4)_2$, $CaHPO_4$, or $Ca_3(PO_4)_2$) precipitation, calcium chloride ($CaCl_2$) precipitation, microinjection, a polyethyleneglycol (PEG) method, a DEAE-dextran method, a cationic liposome method, a lithium acetate-DMSO method, etc., but is not limited thereto.

Additionally, as used herein, the term "operable linkage" may mean that the polynucleotide sequence is functionally linked to a promoter sequence that initiates and mediates transcription of the polynucleotide encoding the target protein of the present disclosure. The operable linkage may be prepared using a gene recombinant technique known in the art, and site-specific DNA cleavage and linkage may be prepared using enzymes for cleavage and ligation known in the art, etc., but the operable linkage is not limited thereto.

Still another aspect of the present disclosure may provide a microorganism producing an L-amino acid, including a modified polypeptide having citrate synthase activity, wherein the amino acid corresponding to the 312th position from the N-terminus of a polypeptide composed of an amino acid sequence of SEQ ID NO: 1 is substituted with another amino acid, a polynucleotide encoding the modified polypeptide, and a vector including the polynucleotide.

The amino acid sequence of SEQ ID NO: 1, the citrate synthase, the modified polypeptide, the nucleotide, and the vector are as described above.

The microorganism may be one which includes a polynucleotide encoding the modified polypeptide or which is transformed with a vector including a polynucleotide encoding the modified polypeptide, but is not limited thereto.

Additionally, the microorganism may have an improved L-amino acid-producing ability without inhibitions of growth or sugar consumption rate of the microorganism, as compared to a microorganism including a wild-type polypeptide. Therefore, an L-amino acid can be obtained in high yield from these microorganisms.

As used herein, the term "microorganism including a modified polypeptide" refers to a microorganism naturally having a weak L-amino acid-producing ability, or a microorganism provided with an L-amino acid-producing ability in a parent strain which has no L-amino acid-producing ability. Specifically, the microorganism is a microorganism expressing the modified polypeptide including at least one amino acid modification in the polypeptide having citrate synthase activity, and the amino acid modification may include a substitution of the amino acid corresponding to the 312th position from the N-terminus of the amino acid sequence of SEQ ID NO: 1 with another amino acid. The modified polypeptide having citrate synthase activity expressed from the microorganism may have attenuated activity, but is not limited thereto.

The microorganism may be a cell or microorganism which includes a polynucleotide encoding the modified polypeptide or which is transformed with a vector including a polynucleotide encoding the modified polypeptide such that the modified polypeptide can be expressed. For the purpose of the present disclosure, any host cell or microorganism may be used as long as it can produce an L-amino acid by including the modified polypeptide.

As used herein, the term "microorganism producing an L-amino acid" includes all of naturally or artificially genetically modified microorganisms, and it may be a microorganism in which a particular mechanism is enhanced or attenuated due to insertion of a foreign gene, or enhancement or attenuation of the activity of an endogenous gene, and for the purpose of L-amino acid production, it may be a microorganism in which a genetic modification has occurred or the activity is attenuated. For the purpose of the present disclosure, the microorganism producing an L-amino acid may refer to a microorganism which includes the modified polypeptide so that it can produce the desired L-amino acid in an excessive amount from the carbon source in a medium, as compared to a wild-type or unmodified microorganism. In the present disclosure, the "microorganism producing an L-amino acid" may be used interchangeably with "a microorganism having an L-amino acid-producing ability" or "an L-amino acid production microorganism".

The L-amino acid produced by the L-amino acid-producing microorganism may be any one or more selected from the group consisting of leucine, lysine, valine, isoleucine, and o-acetylhomoserine, but is not limited thereto.

Specific examples of the microorganism producing an L-amino acid may include a microorganism strain of the genus *Escherichia, Serratia, Erwinia, Enterobacteria, Salmonella, Streptomyces, Pseudomonas, Brevibacterium, Corynebacterium*, etc., and specifically a microorganism of the genus *Corynebacterium*, and more specifically *Corynebacterium glutamicum*, but is not limited thereto.

Specifically, the microorganism producing an L-amino acid may be the CJL-8100 strain having an L-leucine-producing ability by introducing a variant of isopropyl maleate synthase [leuA_(R558H, G561 D)] into the microorganism of the genus *Corynebacterium, Corynebacterium* CJ3P (Binder et al., Genome Biology 2012, 13:R40) having an L-lysine-producing ability by introducing three mutations [pyc(P458S), hom(V59A), lysC(T311I)] into the microorganisms of the genus *Corynebacterium, Corynebacterium* KCCM11201P, which is a valine-producing strain (U.S. Pat. No. 8,465,962 B2), *Corynebacterium* KCCM11248P, which is an L-isoleucine-producing strain (Korean Patent No. 10-1335789), or *Corynebacterium glutamicum* having an O-acetyl-homoserine-producing ability by deleting a metB gene encoding cystathionine gamma-synthase, which is an O-acetyl-homoserine degradation pathway, and a metY gene encoding O-acetylhomoserine (thiol)-lyase in the microorganism of the genus *Corynebacterium*, and by introducing a mutation (L377K) (U.S. Ser. No. 10/662,450 B2) for releasing feedback inhibition for L-lysine and L-threonine of the lysC gene encoding aspartokinase in order to increase the biosynthesis of O-acetyl-homoserine, but is not limited thereto. For the purpose of the present disclosure, the microorganism producing an L-amino acid may further include the modified polypeptide to increase the production ability of the desired L-amino acid.

As used herein, "the microorganism of the genus *Corynebacterium*" may specifically be *Corynebacterium glutamicum, Corynebacterium ammoniagenes, Brevibacterium lactofermentum, Brevibacterium flavum, Corynebacterium thermoaminogenes, Corynebacterium efficiens*, etc., but is not necessarily limited thereto. More specifically, the microorganism of the genus *Corynebacterium* of the present disclosure may be *Corynebacterium glutamicum*, in which the yield of the L-amino acid is increased while having a similar sugar consumption rate although the citrate synthase activity is attenuated as compared to an unmodified microorganism.

Still another aspect of the present disclosure may provide a method for producing an L-amino acid, including:

culturing a microorganism including a modified polypeptide having citrate synthase activity, wherein the amino acid corresponding to the 312th position from the N-terminus of a polypeptide composed of an amino acid sequence of SEQ ID NO: 1 is substituted with another amino acid, a polynucleotide encoding the modified polypeptide, or a vector including the polynucleotide in a medium.

The amino acid sequence of SEQ ID NO: 1, the citrate synthase, the modified polypeptide, the polynucleotide, the vector, and the microorganism are as described above.

The method may be easily determined by those skilled in the art under the optimized culture conditions and enzyme activity conditions known in the art. Specifically, the microorganism may be cultured by a known batch culture, continuous culture, fed-batch culture, etc., but is not particularly limited thereto. In particular, the culture conditions are not particularly limited, but the pH (e.g., pH 5 to pH 9, specifically pH 6 to pH 8, and most specifically pH 6.8) may be appropriately adjusted using a basic compound (e.g., sodium hydroxide, potassium hydroxide, or ammonia) or an acidic compound (e.g., phosphoric acid or sulfuric acid). An aerobic condition may be maintained by adding oxygen or an oxygen-containing gas mixture to the culture. The culture temperature may be maintained at 20° C. to 45° C., and specifically at 25° C. to 40° C., and the culture may be performed for about 10 to 160 hours, but the culture conditions not limited thereto. The L-amino acid produced by the culture may be secreted into the medium or may remain within the cells.

Additionally, in the culture medium used, carbon sources, such as sugars and carbohydrates (e.g., glucose, sucrose, lactose, fructose, maltose, molasses, starch, and cellulose), oils and fats (e.g., soybean oil, sunflower seed oil, peanut oil, and coconut oil), fatty acids (e.g., palmitic acid, stearic acid, and linoleic acid), alcohols (e.g., glycerol and ethanol), and organic acids (e.g., acetic acid), may be used alone or in combination, but are not limited thereto; nitrogen sources, such as nitrogen-containing organic compounds (e.g., peptone, yeast extract, meat juice, malt extract, corn steep liquor, soybean flour, and urea) or inorganic compounds (e.g., ammonium sulfate, ammonium chloride, ammonium phosphate, ammonium carbonate, and ammonium nitrate), may be used alone or in combination, but are not limited thereto; and phosphorus sources, such as potassium dihydrogen phosphate, dipotassium hydrogen phosphate, or sodium-containing salts corresponding thereto, may be used alone or in combination, but are not limited thereto. Additionally, other essential growth-stimulating materials including metal salts (e.g., magnesium sulfate or iron sulfate), amino acids, and vitamins may be contained in the medium, but the essential growth-stimulating materials are not limited thereto.

The method may further include a step of recovering L-amino acids from the cultured medium or microorganism after the culturing step, but is not limited thereto.

In the method of recovering the L-amino acid produced in the culturing step, it is possible to collect the desired amino acid from the culture solution using an appropriate method known in the art according to the culturing method. For example, centrifugation, filtration, anion-exchange chromatography, crystallization, HPLC, etc. may be used, and the desired L-amino acid may be recovered from the medium or microorganism using an appropriate method known in the art.

Further, the recovering step may include a purification process, and the purification process may be performed using an appropriate method known in the art. Therefore, the L-amino acid to be recovered may be in a purified form or a microorganism fermentation liquid containing the L-amino acid.

The L-amino acid produced may be any one or more selected from the group consisting of leucine, lysine, valine, isoleucine, and o-acetylhomoserine, but is not limited thereto Still another aspect of the present disclosure may provide a composition for producing an L-amino acid, including a microorganism of the genus *Corynebacterium* containing the modified polypeptide having citrate synthase activity, or a culture thereof.

The microorganism may be a microorganism of the genus *Corynebacterium*, or specifically *Corynebacterium glutamicum*, but is not limited thereto. The microorganism is as described above.

The composition for producing an L-amino acid may mean a composition capable of producing an L-amino acid by the modified polypeptide of the present disclosure, which has citrate synthase activity. The composition may include, without limitation, the modified polypeptide having citrate synthase activity or a configuration capable of operating the modified polypeptide having citrate synthase activity. The modified polypeptide having citrate synthase activity may be in a form included in a vector so as to express a gene operably linked in the introduced host cell.

The composition may further include a cryoprotectant or an excipient. The cryoprotectant or excipient may be a non-naturally occurring substance or a naturally occurring substance, but is not limited thereto. In another embodiment, the cryoprotectant or excipient may be a substance that does not naturally contact with the microorganism, or a substance that is not naturally contained simultaneously with the microorganism, but is not limited thereto.

Still another aspect of the present disclosure may provide the use of the microorganism of the genus *Corynebacterium*, which includes the modified polypeptide having citrate synthase activity, for the production of an L-amino acid.

MODE FOR CARRYING OUT THE INVENTION

Hereinafter, the present disclosure will be described in detail by way of Examples. However, these Examples are for illustrative purposes only and are not intended to limit the scope of the present disclosure.

Example 1: Discovery of gltA Mutation 1-1. Construction of Vector Including gltA In order to construct a gltA mutation library having citrate synthase activity, a recombinant vector containing part of gltA was first constructed. The amino acid sequence and nucleotide sequence of the wild-type gltA are the same as SEQ ID NO: 1 and SEQ ID NO: 2, respectively. PCR was performed using the chromosomal DNA of the wild-type *Corynebacterium glutamicum* strain as a template along with the primers of SEQ ID NO: 5 and SEQ ID NO: 6, and the amplified product was cloned into an *E. coli* vector pCR2.1 using a TOPO cloning kit (Invitrogen) to obtain pCR-gltA.

1-2. Construction of gltA Mutation Library

A gltA mutation library was constructed based on the vector constructed in Example 1-1. The library was constructed using an error-prone PCR kit (clontech Diversify® PCR Random Mutagenesis Kit). A PCR reaction was performed using SEQ ID NO: 5 and SEQ ID NO: 6 as primers under conditions in which mutation could occur. Specifically, the PCR was carried out by pre-heating at 94° C. for 30 seconds, followed by 25 cycles of denaturation at 94° C. for 30 seconds and polymerization at 68° C. for 1 minute and 30 seconds, under conditions in which 0 to 3 mutations occurred per 1,000 bp. The thus-obtained PCR products were used as a megaprimer (500 ng to 125 ng), which were subjected to 25 cycles of denaturation at 95° C. for 50 seconds, annealing at 60° C. for 50 seconds, and polymerization at 68° C. for 12 minutes, treated with DpnI, and transformed into E. coli DH5a, and the transformed E. coli DH5a was plated was a solid LB medium containing kanamycin (25 mg/L). 20 kinds of the transformed colonies were selected and the plasm ids obtained therefrom were subjected to polynucleotide sequence analysis. As a result, it was confirmed that mutations were introduced into sites different from each other at a frequency of 2 mutation/kb. As a result, about 20,000 E. coli transformed colonies were collected and the plasmids were extracted therefrom and named pTOPO-gltA library.

Primers used in the Example are shown in Table 1 below.

TABLE 1

| SEQ ID NO: | Name | Sequence (5'→3') |
|---|---|---|
| 5 | pCR-gltA F | CTAATCTCGAGGTCACCCATG TTTGAAAGG |
| 6 | pCR-gltA R | TCGCGAGGAGCGCTAAAACCG GTTGAT |
| 7 | gltA F | CAATGCTGGCTGCGTACGC |
| 8 | gltA R | CTCCTCGCGAGGAACCAACT |
| 9 | gltA M312I Up F | GTGAATTCGAGCTCGGTACCC GCGGGAATCCTGCGTTACCGC |
| 10 | gltA M312I Up R | TGTAAACGCGGTGTCCGAAGC CGATGAGGCGGACGCCGTCTT |
| 11 | gltA M312I Down F | AAGACGGCGTCCGCCTCATCG GCTTCGGACACCGCGTTTACA |
| 12 | gltA M312I Down R | GGTCGACTCTAGAGGATCCCC TTAGCGCTCCTCGCGAGGAAC |
| 13 | leuA F | ACCGAAATTGGCTTGGGTGCC AGCCCAGCTGATGCCTAC |
| 14 | leuA R | AAGCTTGCATGCCTGCAGCTT AAAGTCACCTACGTTTTGTAC |

Example 2: Evaluation of Constructed Library and Selection of Variants

The pTOPO-gltA-library constructed in Example 1-2 was transformed into Corynebacterium glutamicun ATCC13032 by electroporation, and then plated on a nutrient medium containing 25 mg/L of kanamycin to obtain colonies of 10,000 strains in which the mutant gene was inserted, and each colony was named from ATCC13032/pTOPO_gltA (mt)1 to ATCC13032/pTOPO_gltA(mt) 10000, respectively.

Fermentation titer evaluation was performed for each colony in the following manner to identify the colonies with increased leucine production among the 10,000 colonies obtained above.

Production Medium: Glucose 100 g, $(NH_4)_2SO_4$ 40 g, Soy Protein 2.5 g, Corn Steep Solids 5 g, Urea 3 g, $KH_2PO_4$ 1 g, $MgSO_4.7H_2O$ 0.5 g, Biotin 100 μg, Thiamine HCl 1,000 μg, Calcium-Pantothenic Acid 2,000 μg, Nicotinamide 3,000 μg, $CaCO_3$ 30 g (based on 1 L of distilled water), pH 7.0

Each colony was inoculated into a 250 mL corner-baffle flask containing 25 μg/mL of kanamycin in a 25 mL of an autoclaved production medium using a platinum loop, and cultured with shaking at 30° C. at 200 rpm for 60 hours. After completion of the culture, the the amount of leucine produced was measured by a method using high-performance liquid chromatography (HPLC, SHIMAZDU LC20A) to select one strain having the most improved leucine-producing ability compared to the wild-type Corynebacterium glutamicum strain. The concentration of leucine produced in the selected strains is shown in Table 2 below.

TABLE 2

| Strain | Leucine (g/L) |
|---|---|
| ATCC13032 | 0.87 |
| ATCC13032/pTOPO_gltA(mt)3142 | 1.54 |

Next, in order to confirm the genetic mutation of the mutant strain, PCR was performed using the primers of SEQ ID NO: 7 and SEQ ID NO: 8 based on the ATCC13032/pTOPO_gltA(mt)3142 strain, followed by sequencing to compare the gltA gene with the wild-type ATCC13032. As a result, it was confirmed that the above strain contained a mutation in the gltA gene.

Specifically, it was confirmed that G, which was the 936th nucleotide of the gltA gene in the ATCC13032/pTOPO_gltA (mt)3142 strain, was substituted with C. This is a mutation in which methionine at the 312th position in the amino acid sequence of gltA is substituted with isoleucine. Therefore, in the following Examples, it was attempted to confirm whether the mutation has an effect on the amount of leucine produced in the microorganisms of the genus Corynebacterium.

Example 3: Confirmation of Leucine-Producing Ability of gltA Selection Mutation 3-1. Construction of Insertion Vector Containing gltA Mutation In order to introduce the mutation selected in Example 2 into the strain, an attempt was made to construct an insertion vector. The vector for introducing gltA(M312I) mutation was constructed using a site directed mutagenesis method. PCR was performed using the chromosomal DNA of the wild-type Corynebacterium glutamicum strain as a template along with a primer pair of SEQ ID NOS: 9 and 10 and a primer pair of SEQ ID NOS: 11 and 12. The PCR was performed by denaturation at 94° C. for 5 minutes, followed by 30 cycles of denaturation at 94° C. for 30 seconds, annealing at 55° C. for 30 seconds, and polymerization at 72° C. for 1 minute and 30 seconds, and then polymerization at 72° C. for 5 minutes. As a result, the pDC vector in which the resulting gene fragment was cleaved with a SmaI restriction enzyme, and the pDC-gltA(M312I) vector in which methionine, which is the 312th amino acid, was substituted with isoleucine by linking and cloning the homologous sequence of 15 nucleotides at the ends of the DNA fragments using an In-Fusion enzyme were constructed.

3-2. Introduction of Variant into ATCC13032 and Evaluation Thereof

The pDC-gltA (M312I) vector constructed in Example 3-1 was transformed into ATCC13032, and the strain into which the vector was inserted on the chromosome by recombination of the homologous sequence was selected in a medium containing 25 mg/L of kanamycin. The selected primary strain was again subjected to a secondary crossover, and the strain into which the mutation of the target gene was introduced was selected. Introduction of the gltA gene mutation into the finally transformed strain was confirmed by performing PCR using the primers of SEQ ID NO: 7 and SEQ ID NO: 8, and then analyzing the base sequence, thereby confirming that the mutation was introduced into the strain. The constructed strain was named ATCC13032_gltA_M312I.

In order to evaluate the leucine-producing ability of the ATCC13032_gltA_M312I strain constructed above, flask fermentation titer evaluation was also carried out. Each of the *Corynebacterium glutamicum* ATCC13032, which is the parent strain, and the ATCC13032_gltA_M312I constructed above were inoculated with one platinum loop in a 250 mL corner-baffle flask containing 25 mL of the production medium of Example 2 and cultured with shaking at 200 rpm at 30° C. for 60 hours to produce leucine. After completion of the culture, the amount of leucine produced was measured by HPLC. The concentration of leucine in the culture medium for each strain tested is shown in Table 3 below.

TABLE 3

| Name of Strains | Leucine (g/L) |
|---|---|
| ATCC13032 | 0.87 |
| ATCC13032_gltA_M3121 | 1.25 |

Example 4: Confirmation of Leucine-Producing Ability of gltA Selection Mutation in Leucine-Producing Strains Although the wild-type strain of the genus *Corynebacterium* produces leucine, only very trace amounts are produced. Accordingly, a leucine-producing strain derived from ATCC13032 was constructed, and an experiment was conducted to confirm the leucine-producing ability by introducing the selected mutation. The specific experiment is as follows.

4-1. Construction of Leucine-Producing Strain CJL-8100

In order to construct a high-concentration leucine-producing strain derived from ATCC13032, a CJL-8100 strain introduced with an isopropylmalate synthase (hereinafter referred to as "IPMS") variant was constructed. The mutation includes a mutation in which G, the $1,673^{rd}$ nucleotide of the leuA gene encoding IPMS, is substituted with A, such that arginine, the $558^{th}$ amino acid of the IPMS protein, is substituted with histidine, and a mutation in which GC, the $1,682^{th}$ and $1,683^{th}$ nucleotides, were substituted with AT such that glycine, the $561^{st}$ amino acid, is substituted with aspartic acid.

The pDC-leuA (R558H, G561D) vector containing the leuA mutation was transformed into ATCC13032, and the strain into which the vector was inserted on the chromosome by recombination of the homologous sequence was selected in a medium containing 25 mg/L of kanamycin. The selected primary strain was subjected to a secondary crossover again, and the strain into which the mutation of the leuA gene was introduced was selected. Introduction of the mutation into the finally transformed strain was confirmed by performing PCR using the primers of SEQ ID NO: 13 and SEQ ID NO: 14, and then analyzing the base sequence, thereby confirming that the mutation was introduced. The ATCC13032_leuA_(R558H, G561D) strain transformed into the pDC-leuA (R558H, G561D) vector was named CJL-8100.

4-2. Introduction of gltA Variant into CJL-8100 Strain and Evaluation Thereof

CJL-8100, the leucine-producing strain, was transformed with the pDC-gltA (M312I) vector constructed in Example 3-1, and the strain into which the vector was inserted on the chromosome by recombination of the homologous sequence in a medium containing 25 mg/L of kanamycin was selected. The selected primary strain was subjected to secondary crossover again, and the strain into which the mutation of the target gene was introduced was selected. Introduction of the gltA gene mutation into the finally transformed strain was confirmed by performing PCR using the primers of SEQ ID NO: 7 and SEQ ID NO: 8, and then analyzing the base sequence, thereby confirming that the gltA mutation was introduced into the strain. The constructed CJL8100_gltA_M312I was named CA13-8104 and deposited at the Korean Culture Center of Microorganisms (KCCM), an International Depositary Authority, under Budapest Treaty on Dec. 20, 2019, with Accession No. KCCM 12649P.

The leucine-producing ability of the CA13-8104 strain constructed above was evaluated. Flask culture was performed in the same manner as in Example 2, and after completion of the culture, the amount of leucine produced was measured by a method using HPLC, and the culture results are shown in Table 4 below.

TABLE 4

| Name of Strains | Leucine (g/L) |
|---|---|
| ATCC13032 | 0.87 |
| ATCC13032_leuA_(R558H, G561D): CJL-8100 | 2.7 |
| CJL8100_gltA_M312I: CA13-8104 | 3.0 |

As shown in Table 4, it was confirmed that the leucine-producing strain *Corynebacterium glutamicum* CJL8100 significantly improved the leucine-producing ability as compared to the parent strain *Corynebacterium glutamicum* ATCC13032. Further, it was confirmed that the CJL8104 strain, in which the gltA M312I mutation was introduced into the *Corynebacterium glutamicum* CJL8100 strain, a leucine-producing strain, improved the leucine-producing ability by 10% as compared to the parent strain CJL8100.

Additionally, the leucine-producing strain CJL-8100 was transformed with pTOPO-gltA(mt)3142 among the pTOPO-gltA-library constructed in Example 1-2 by electroporation, and then the strain transformed with the vector in a medium containing 25 mg/L of kanamycin was selected. The selected strain was named CJL8100/pTOPO_gltA(mt)3142.

The leucine-producing ability of the CJL8100/pTOPO_gltA(mt)3142 strain constructed above was evaluated. Flask culture was performed in the same manner as in Example 2, and after completion of the culture, the amount of leucine produced was measured by a method using HPLC, and the culture results are shown in Table 5 below.

TABLE 5

| Name of Strains | Leucine (g/L) |
| --- | --- |
| CJL8100 | 2.6 |
| CJL8100/pTOPO_gltA(mt)3142 | 2.8 |

Through the results of the above Example, it can be confirmed that the amino acid at the 312th position in the amino acid sequence of gltA, which is citrate synthase, is an important position for gltA enzyme activity.

Example 5: Construction of CJ3P Strain into which OA Mutant Strain (M312I) was Introduced and Analysis of Amount Lysine Produced In order to confirm whether there is an effect of changing the citrate synthase activity even in the strain belonging to *Corynebacterium glutamicum* that produces L-lysine, a strain into which the gltA (M312I) mutation was introduced was constructed based on the *Corynebacterium glutamicum* CJ3P (Binder et al., Genome Biology 2012, 13:R40) having L-lysine-producing ability by introducing three kinds of mutations were introduced into the wild strains [pyc (P458S), horn (V59A), lysC (T311I)], in the same manner as in Example 3. The thus-constructed strain was named CJ3P::gltA (M312I). The CJ3P strain, which is the control group, and CJ3P::gltA (M312I) were measured for the amount of lysine produced by the following method. First, each strain was inoculated into a 250 mL corner-baffle flask containing 25 mL of a seed medium, and cultured with shaking at 200 rpm at 30° C. for 20 hours. Then, 1 mL of the seed culture solution was inoculated into a 250 mL corner-baffle flask containing 24 mL of a production medium, and cultured with shaking at 200 rpm at 32° C. for 72 hours. Compositions of the seed medium and production medium are shown below. After completion of the culture, the concentration of L-lysine was measured using HPLC (Waters 2478), and the results are shown in Table 6.

Seed Medium (pH 7.0)

Glucose 20 g, Peptone 10 g, Yeast Extract 5 g, Urea 1.5 g, $KH_2PO_4$ 4 g, $K_2HPO_4$ 8 g, $MgSO_4 \cdot 7H_2O$ 0.5 g, Biotin 100 µg, Thiamin HCl 1,000 µg, Calcium-Pantothenic Acid 2,000 µg, Nicotinamide 2,000 µg (based on 1 L of distilled water)

Production Medium (pH 7.0)

Glucose 100 g, $(NH_4)_2SO_4$ 40 g, Soy Protein 2.5 g, Corn Steep Solids 5 g, Urea 3 g, $KH_2PO_4$ 1 g, $MgSO_4 \cdot 7H_2O$ 0.5 g, Biotin 100 µg, Thiamin HCl 1,000 µg, Calcium-Pantothenic Acid 2,000 µg, Nicotinamide 3,000 µg, $CaCO_3$ 30 g (based on 1 L of distilled water)

TABLE 6

| Name of Strains | Lysine (g/L) |
| --- | --- |
| CJ3P | 8.8 |
| CJ3P::gltA(M312I) | 11.2 |

As shown in Table 6, the CJ3P::gltA(M312I) strain in which the gltA(M312I) mutation was introduced into the *Corynebacterium glutamicum* CJ3P, a lysine-producing strain, improved the amount of lysine produced by 127% as compared to the parent strain.

Example 6: Confirmation of Valine-Producing Ability of gltA Selection Mutation in Valine-Producing Strain In order to confirm whether the selected mutation has an effect on valine, a representative branched-chain amino acid as leucine, an experiment to confirm the valine-producing ability was conducted by introducing the selected mutation into the valine-producing strain KCCM11201P (U.S. Pat. No. 8,465,962 B2) of the genus *Corynebacterium*.

KCCM11201P was transformed with the pDC-gltA (M312I) vector constructed in Example 3-1, and the strain into which the vector was inserted on the chromosome by recombination of the homologous sequence in a medium containing 25 mg/L of kanamycin was selected. The selected primary strain was subjected to secondary crossover again, and the strain into which the mutation of the target gene was introduced was selected. Introduction of the gltA gene mutation into the finally transformed strain was confirmed by performing PCR using the primers of SEQ ID NO: 7 and SEQ ID NO: 8, and then analyzing the base sequence, thereby confirming that the gltA mutation was introduced into the strain. The thus-constructed strain was named KCCM11201P-gltA(M312I).

The valine-producing ability of the KCCM11201P-gltA (M312I) strain constructed above was evaluated. Flask culture was performed in the same manner as in Example 2-2, and after completion of the culture, the amount of valine produced was measured by a method using HPLC, and the culture results are shown in Table 7 below.

TABLE 7

| Name of Strains | Valine (g/L) |
| --- | --- |
| KCCM11201P -gltA(M312I) | 2.6 |
| KCCM11201P -gltA(M312I) | 2.8 |

As shown in Table 7, it was confirmed that the KCCM11201P-gltA(M312I) strain in which the gltA M312I mutation was introduced into the *Corynebacterium glutamicum* KCCM11201P strain, which is a valine-producing strain, improved valine-producing ability by 7% as compared to KCCM11201P, the parent strain.

Through the above results, it can be confirmed that the amino acid at the 312th position of the amino acid sequence of gltA, which is citrate synthase, is an important position for gltA enzyme activity.

Example 7: Confirmation of L-Isoleucine-Producing Ability of gltA Selection Mutation in Isoleucine-Producing Strain 7-1. Construction of L-Isoleucine Strain Introduced with gltA(M312I) ORF Mutation in L-Isoleucine-Producing Strain *Corynebacterium glutamicum* KCCM11248P and Evaluation of L-Isoleucine Producing Ability Thereof A strain in which the recombinant plasmid pDC-gltA (M312I) constructed in Example 3-1 was introduced into the *Corynebacterium glutamicum* KCCM11248P, an L-isoleucine producing strain, (Korean Patent No. 10-1335789) was prepared by homologous recombination on the chromosome in the same manner as in Example 4 and named KCCM11248P::gltA(M312I). The thus-constructed strains were cultured in the following manner to compare the isoleucine-producing ability.

Each strain was inoculated into a 250 mL corner-baffle flask containing 25 mL of a seed medium, and cultured with shaking at 200 rpm at 30° C. for 20 hours. Then, 1 mL of the seed culture solution was inoculated into a 250 mL corner-baffle flask containing 24 mL of a production medium, and cultured with shaking at 200 rpm at 30° C. for 48 hours. Compositions of the seed medium and production medium are shown below.

Seed Medium (pH 7.0)

Glucose 20 g, Peptone 10 g, Yeast Extract 5 g, Urea 1.5 g, $KH_2PO_4$ 4 g, $K_2HPO_4$ 8 g, $MgSO_4.7H_2O$ 0.5 g, Biotin 100 μg, Thiamin HCl 1,000 μg, Calcium-Pantothenic Acid 2,000 μg, Nicotinamide 2,000 μg (based on 1 L of distilled water)

Production Medium (pH 7.0)

Glucose 50 g, $(NH_4)_2SO_4$ 12.5 g, Soy Protein 2.5 g, Corn Steep Solids 5 g, Urea 3 g, $KH_2PO_4$ 1 g, $MgSO_4.7H_2O$ 0.5 g, Biotin 100 μg, Thiamin HCl 1,000 μg, Calcium-Pantothenic Acid 2,000 μg, Nicotinamide 3,000 μg, $CaCO_3$ 30 g (based on 1 L of distilled water)

After completion of the culture, the L-isoleucine-producing ability was measured by HPLC. The concentration of L-isoleucine in the culture solution for each of the tested strains is shown in Table 8 below.

TABLE 8

|  | | L-isoleucine (g/L) | | | |
|---|---|---|---|---|---|
|  | Name of Strains | Batch 1 | Batch 2 | Batch 3 | Average |
| Control | KCCM11248P | 1.2 | 1.6 | 1.4 | 1.4 |
| Experimental Group | KCCM11248P-gltA(M312I) | 2.0 | 1.8 | 1.8 | 1.9 |

As shown in Table 8, it was confirmed that the concentration of L-isoleucine increased by about 36% in the KCCM11248P::gltA (M312I), into which the gltA (M312I) mutation was introduced, as compared to the L-isoleucine producing strain KCCM11248P. Based on the result, it was confirmed that the L-isoleucine-producing ability can be improved through mutation of the gltA (M312I) gene.

The above results imply that the introduction of the gltA (M312I) mutation in the L-isoleucine-producing strain of the genus *Corynebacterium* is effective for the production of L-isoleucine.

7-2. Construction of L-Isoleucine Strain Introduced with gltA(M312I) ORF Mutation in *Corynebacterium glutamicum* Wild-Type Strain ATCC13032 and Evaluation of L-Isoleucine-Producing Ability Thereof In order to confirm the effect of introducing of gltA (M312I) mutation on the L-isoleucine-producing ability, a strain introduced with the lysC(L377K) variant (Korean Patent No. 10-2011994) and hom(R407H) variant based on the *Corynebacterium glutamicum* ATCC13032 (hereinafter WT) strain was constructed, and the ilvA (V323A) mutation (Appl. Enviro. Microbiol., December 1995, p. 4315-4320) was introduced into the gene encoding a known threonine dehydratase (L-threonine dehydratase) to compare the L-isoleucine-producing ability.

PCR was performed using the WT chromosomal DNA as a template along with the primers of SEQ ID NOS: 15 and 16 or SEQ ID NOS: 17 and 18. The sequences of the primers used are shown in Table 9 below.

TABLE 9

| SEQ ID NO: | Name | Sequence (5'→3') |
|---|---|---|
| 15 | lysC up F | tcctctagaGCTGCGCAGTGTTGAATACG |
| 16 | lysC up R | TGGAAATCttTTCGATGTTCACGTTGACAT |
| 17 | lysC down F | ACATCGAAaaGATTTCCACCTCTGAGATTC |
| 18 | lysC down R | gactctagaGTTCACCTCAGAGACGATTA |

PCR was performed under PCR conditions of denaturation at 95° C. for 5 minutes, followed by 30 cycles of denaturation at 95° C. for 30 seconds, annealing at 55° C. for 30 seconds, and polymerization at 72° C. for 30 seconds, and then polymerization at 72° C. for 7 minutes. As a result, a 509 bp DNA fragment at the 5' upper region and a 520 bp DNA fragment at the 3' lower region were obtained around the mutation of the lysC gene.

Using the two amplified DNA fragments as templates, PCR was performed along with the primers of SEQ ID NOS: 15 and 18 by denaturation at 95° C. for 5 minutes, followed by 30 cycles of denaturation at 95° C. for 30 seconds, annealing at 55° C. for 30 seconds, and polymerization at 72° C. for 60 seconds, and then polymerization at 72° C. for 7 minutes. As a result, a 1,011 bp DNA fragment containing the mutation of the lysC gene encoding the aspartokinase variant, in which the 377th leucine was substituted with lysine, was amplified.

The pDZ vector (Korean Patent No. 0924065), which cannot be replicated in *Corynebacterium glutamicum*, and the 1,011 bp DNA fragments were treated with a restriction enzyme XbaI, ligated using a DNA ligation enzyme, and then cloned to obtain a plasmid, which was named pDZ-lysC (L377K).

The pDZ-lysC (L377K) vector obtained above was introduced into the WT strain by an electric pulse method (Appl. Microbiol. Biothcenol. (1999, 52:541-545)), and then the transformed strain was obtained in a selection medium containing 25 mg/L of kanamycin. Through a secondary crossover, WT::lysC (L377K), which is a strain in which a nucleotide mutation was introduced into the lysC gene by the DNA fragment inserted on the chromosome, was obtained. The gene into which the nucleotide mutation was introduced was finally confirmed by PCR using the primers of SEQ ID NOS: 15 and 18, followed by sequencing, and comparing the sequence with that of the wild-type lysC gene.

Additionally, in order to construct a vector into which hom(R407H) was introduced, PCR was performed using the WT genomic DNA as a template along with the primers of SEQ ID NOS: 19 and 20 and SEQ ID NOS: 21 and 22. The sequences of the primers used are shown in Table 10 below.

TABLE 10

| SEQ ID NO: | Name | Sequence (5'→3') |
|---|---|---|
| 19 | hom up F | tcctctagaCTGGTCGCCTGATGTTCTAC |
| 20 | hom up R | CACGATCAGATGTGCATCATCAT |
| 21 | hom down F | ATGATGATGCACATCTGATCGTG |
| 22 | hom down R | gactctagaTTAGTCCCTTTCGAGGCGGA |

PCR was performed under PCR conditions of denaturation at 95° C. for 5 minutes, followed by 30 cycles of denaturation at 95° C. for 30 seconds, annealing at 55° C. for 30 seconds, and polymerization at 72° C. for 30 seconds, and then polymerization at 72° C. for 7 minutes. As a result, a 220 bp DNA fragment at the 5' upper region and a 220 bp DNA fragment at the 3' lower region were obtained around the mutation of the horn gene. Using the two amplified DNA fragments as templates, PCR was performed using the primers of SEQ ID NOS: 5 and 8. PCR was performed under PCR amplification conditions of denaturation at 95° C. for 5 minutes, followed by 30 cycles of denaturation at 95° C. for 30 seconds, annealing at 55° C. for 30 seconds, and polymerization at 72° C. for 30 seconds, and then polymerization at 72° C. for 7 minutes. As a result, a 440 bp DNA fragment containing the mutation of the horn gene was amplified.

The pDZ vector used above and the 440 bp DNA fragments were treated with a restriction enzyme XbaI, ligated using a DNA ligation enzyme, and then cloned to obtain a plasmid, which was named pDZ-hom(R407H).

The pDZ-hom(R407H) vector obtained above was introduced into the WT::lysC(L377K) strain by an electric pulse method, and then the transformed strain was obtained in a selection medium containing 25 mg/L of kanamycin. Through a secondary crossover, WT::lysC(L377K)-hom (R407H), which is a strain in which a nucleotide mutation was introduced into the horn gene by the DNA fragment inserted on the chromosome, was obtained.

A strain, in which the recombinant plasmid pDC-gltA (M312I) constructed in Example 3-1 was introduced into the WT::lysC(L377K)-hom (R407H) strain, was prepared by homologous recombination on the chromosome in the same manner as in the above Example, and was named WT::lysC (L377K)-hom(R407H)-gltA(M312I).

A primer pair (SEQ ID NOS: 23 and 24) for the amplification of the 5' upper region and a primer pair (SEQ ID NOS: 25 and 26) for the amplification the 3' lower region were designed around the mutation site in order to construct a vector into which a known ilvA (V323A) mutation was introduced based on the ilvA gene. The primers of SEQ ID NOS: 23 and 26 were inserted with a BamHI restriction enzyme site (indicated by underline) at each end, and the primers of SEQ ID NOS: 24 and 25 were designed to crossover with each other so as to locate the nucleotide substitution mutations (indicated by underline) at the designed sites. The sequences of the primers were shown in Table 11 below.

TABLE 11

| SEQ ID NO: | Name | Sequence (5'→3') |
|---|---|---|
| 23 | ilvA V323A up F | ACGGATCCCAGACTCCAAAGCAAAAGCG |
| 24 | ilvA V323A up R | ACACCACGgCAGAACCAGGTGCAAAGGACA |
| 25 | ilvA V323A down F | CTGGTTCTGcCGTGGTGTGCATCATCTCTG |
| 26 | ilvA V323A down R | ACGGATCCAACCAAACTTGCTCACACTC |

PCR was performed using the WT chromosomal DNA as a template along with the primers of SEQ ID NO: 23, SEQ ID NO: 24, SEQ ID NO: 25, and SEQ ID NO: 26. PCR was performed under PCR conditions of denaturation at 95° C. for 5 minutes, followed by 30 cycles of denaturation at 95° C. for 30 seconds, annealing at 55° C. for 30 seconds, and polymerization at 72° C. for 30 seconds, and then polymerization at 72° C. for 7 minutes. As a result, a 627 bp DNA fragment at the 5' upper region and a 608 bp DNA fragment at the 3' lower region were obtained around the mutation of the ilvA gene.

Using the two amplified DNA fragments as templates, PCR was performed using the primers of SEQ ID NOS: 23 and 26 by denaturation at 95° C. for 5 minutes, followed by 30 cycles of denaturation at 95° C. for 30 seconds, annealing at 55° C. for 30 seconds, and polymerization at 72° C. for 60 seconds, and then polymerization at 72° C. for 7 minutes. As a result, a 1,217 bp DNA fragment containing the mutation of the ilvA gene encoding the ilvA variant in which valine at the 323th position was substituted with alanine was amplified.

The pECCG117 vector (Korean Patent No. 10-0057684) and the 1,011 bp DNA fragments were treated with a restriction enzyme BamHI, ligated using a DNA ligation enzyme, and then cloned to obtain a plasmid, which was named pECCG117-ilvA(V323A).

A strain in which the pECCG117-ilvA(V323A) vector was introduced into the ATCC13032::hom(R407H)-lysC (L377K)-gltA(M312I) of the above Example was constructed. Additionally, a strain in which only the ilvA (V323A) mutation was introduced into the ATCC13032::-hom (R407H)-lysC (L377K) was also constructed as a control.

The thus-constructed strains were cultured in the same manner as the flask culture method shown in Example 4-1 to analyze the L-isoleucine concentration in the culture solution, and the results are shown in Table 12 below.

TABLE 12

|  | Name of Strains | L-isoleucine (g/L) | | | |
|---|---|---|---|---|---|
|  |  | Batch 1 | Batch 2 | Batch 3 | Average |
| Control | ATCC13032::-hom(R407H)-lysC(L377K)/pECCG117-ilvA(V323A) | 4.4 | 4.5 | 4.3 | 4.4 |
| Experimental Group | ATCC13032::hom(R407H)-lysC(L377K)-gltA(M312I)/pECCG117-ilvA(V323A) | 6.3 | 6.7 | 5.9 | 6.3 |

As shown in Table 12, it was confirmed that the concentration of L-isoleucine was increased by about 43% in the ATCC13032::-hom(R407H)-lysC(L377K)-gltA(M312I)/pECCG117-ilvA(V323A) into which the gltA (M312I) mutation was introduced, as compared to the wild-type strain ATCC13032::-hom(R407H)-lysC(L377K)/pECCG117-ilvA(V323A).

The above results indicate that the introduction of the gltA (M312I) mutation into the L-isoleucine-producing strain of the genus *Corynebacterium* is effective for the production of L-isoleucine.

Example 8: Construction of Strains with Improved O-Acetylhomoserine-Producing Ability and Evaluation of O-Acetylhomoserine-Producing Ability In order to investigate the effect of introducing the gltA (M312I) mutation on the production of O-acetyl-homoserine, O-acetyl-homoserine-producing strains were constructed by deleting the metB gene encoding cystathionine gamma-synthase in the O-acetyl-homoserine degradation pathway, and the metY gene encoding O-acetylhomoserine (thiol)-lyase in the O-acetyl-homoserine degradation pathway, and by introducing the mutation (L377K) (U.S. Ser. No. 10/662,450 B2) for releasing feedback inhibition for L-lysine and L-threonine of the lysC gene into the lysC gene (SEQ ID NO: 11) encoding aspartokinase in order to increase the biosynthesis of O-acetyl-homoserine.

First, in order to delete the metB gene, the metB gene encoding cystathionine gamma-synthase of the O-acetylhomoserine degradation pathway was obtained through PCR using the chromosomal DNA of *Corynebacterium glutamicum* ATCC13032 as a template. The nucleotide sequence information of the metB gene (NCBI registration number Ncgl2360, SEQ ID NO: 27) was obtained from the National Institutes of Health's GenBank (NIH GenBank). Based on the information, primers (SEQ ID NOS: 28 and 29), which includes the N-terminal region and a linker region of the metB gene, and primers (SEQ ID NOS: 30 and 31), which includes the C-terminal region and a linker region, were synthesized. The primer sequences are shown in Table 13 below.

TABLE 13

| SEQ ID NO: | Name | Sequence (5'→3') |
|---|---|---|
| SEQ ID NO: 28 | metB_N_del F | TCTAGACGCCCGCATACTGGCTTC |
| SEQ ID NO: 29 | metB_N_del R | CCCATCCACTAAACTTAAACAGATGTGATCGCCCGGC |

TABLE 13-continued

| SEQ ID NO: | Name | Sequence (5'→3') |
|---|---|---|
| SEQ ID NO: 30 | metB_C_del F | TGTTTAAGTTTAGTGGATGGGGAAGAACCACCCAGGCC |
| SEQ ID NO: 31 | metB_C_del R | GTCGACCAATCGTCCAGAGGGCG |

PCR was performed using the chromosomal DNA of ATCC13032 as a template along with the primers of SEQ ID NOS: 28 and 29 and SEQ ID NOS: 30 and 31. PfuUltra™ high-reliability DNA polymerase (Stratagene) was used as the polymerase, and PCR was performed by repeating 30 cycles of denaturation at 96° C. for 30 seconds, annealing at 53° C. for 30 seconds, and polymerization at 72° C. for 1 minute. As a result, a 558 bp amplified gene, which includes the N-terminal region and a linker region of the metB gene, and a 527 bp amplified gene, which includes the C-terminal region and a linker region of the metB gene, were each obtained.

PCR was performed using the two amplified DNA genes obtained above as templates by repeating 10 cycles of denaturation at 96° C. for 60 seconds, annealing at 50° C. for 60 seconds, and polymerization at 72° C. for 1 minute, and after adding the primers of SEQ ID NOS: 2 and 5, the polymerization reaction was further repeated for 20 times. As a result, a 1,064 bp inactivation cassette including the N-terminus-linker-C-terminus of the metB gene was obtained. The resulting gene was treated with restriction enzymes XbaI and SalI contained at the end of the PCR fragment obtained through the PCR, and ligated to the pDZ vector(U.S. Pat. No. 9,109,242 B2) treated with restriction enzymes XbaI and SalI and cloned to finally construct a pDZ-ΔmetB recombinant vector in which the metB inactivation cassette was cloned.

The thus-constructed pDZ-ΔmetB vector was transformed into ATCC13032 by an electric pulse method, and through a second crossover process, ATCC13032ΔmetB in which the metB gene was inactivated on the chromosome was obtained. The inactivated metB gene was finally confirmed by comparison with ATCC13032 in which the metB gene was not inactivated after PCR performed using the primers of SEQ ID NOS: 28 and 31.

In order to delete the metY gene, which encodes an enzyme involved in another degradation pathway of O-acetyl-homoserine, the metY gene encoding O-acetylhomoserine (thiol)-lyase of the O-acetylhomoserine degradation pathway was obtained through PCR performed using the chromosomal DNA of *Corynebacterium glutamicum* ATCC13032 as a template. The nucleotide sequence information of the metY gene (NCBI registration number Ncg10625, SEQ ID NO: 32) was obtained from the National Institutes of Health's GenBank (NIH GenBank). Based on the information, primers (SEQ ID NOS: 33 and 34) including the N-terminal region and a linker region of the metY gene and primers (SEQ ID NOS: 35 and 36) including the C-terminal region and a linker region of the metY gene were synthesized. The primer sequences are shown in Table 14 below.

TABLE 14

| SEQ ID NO: | Name | Sequence (5'→3') |
|---|---|---|
| SEQ ID NO: 33 | metY_N_del F | TCTAGACCATCCTGCACCAT TTAG |
| SEQ ID NO: 34 | metY_N_del R | CCCATCCACTAAACTTAAAC ACGCTCCTGCCAGGTTC |
| SEQ ID NO: 35 | metY_C_del F | TGTTTAAGTTTAGTGGATGG GCTTGGTACGCAACCAAGG |
| SEQ ID NO: 36 | metY_C_del R | GTCGACGATTGCTCCGGCTT CGG |

PCR was performed using the chromosomal DNA of ATCC13032 as a template along with the primers of SEQ ID NOS: 33 and 34 and SEQ ID NOS: 35 and 36. PfuUltra™ high-reliability DNA polymerase (Stratagene) was used as the polymerase, and PCR was performed by repeating 30 cycles of denaturation at 96° C. for 30 seconds, annealing at 53° C. for 30 seconds, and polymerization at 72° C. for 1 minute. As a result, a 548 bp amplified gene, which includes the N-terminal region and a linker region of the metY gene, and a 550 bp amplified gene, which includes the C-terminal region and a linker region of the metY gene, were each obtained. PCR was performed using the two amplified DNA genes obtained above as templates by repeating 10 cycles of denaturation at 96° C. for 60 seconds, annealing at 50° C. for 60 seconds, and polymerization at 72° C. for 1 minute, and after adding the primers of SEQ ID NOS: 33 and 34, the polymerization reaction was further repeated for 20 times. As a result, a 1,077 bp inactivation cassette including the N-terminus-linker-C-terminus of the metY gene was obtained. The resulting gene was treated with restriction enzymes XbaI and Sa/I contained at the end of the PCR fragment obtained through the PCR, and ligated to the pDZ vector (U.S. Pat. No. 9,109,242 B2) treated with restriction enzymes XbaI and Sa/I and cloned to finally construct a pDZ-ΔmetY recombinant vector in which the metY inactivation cassette was cloned.

The thus-constructed pDZ-ΔmetY vector was transformed into the ATCC13032 ΔmetB strain by an electric pulse method, and through a second crossover process, ATCC13032 ΔmetB ΔmetY in which the metY gene was inactivated on the chromosome was obtained. The inactivated metY gene was finally confirmed by comparison with ATCC13032 in which the metY gene was not inactivated after PCR performed using the primers of SEQ ID NOS: 7 and 10.

In order to increase the O-acetylhomoserine production, the pDZ-lysC (L377K) vector constructed in Example 7-2 was transformed into the ATCC13032 ΔmetB ΔmetY strain by an electric pulse method to introduce the mutation (L377K) (U.S. Ser. No. 10/662,450 B2) for releasing feedback inhibition for L-lysine and L-threonine of the lysC gene into the lysC gene (SEQ ID NO: 11) encoding aspartokinase derived from Corynebacterium glutamicum ATCC13032. Thereafter, Corynebacterium glutamicum ATCC13032 ΔmetB ΔmetY lysC (L377K) in which a nucleotide mutation was introduced into the lysC gene on the chromosome was obtained through a secondary crossover process. The gene into which the nucleotide mutation was introduced was finally confirmed by PCR performed using the primers of SEQ ID NOS: 15 and 18, followed by sequencing, and comparing the sequence with the wild-type lysC gene.

The pDC-gltA (M312I) vector constructed in Example 3-1 was transformed into the ATCC13032 ΔmetB ΔmetY lysC (L377K) strain by an electric pulse method, and Corynebacterium glutamicum ATCC13032 ΔmetB ΔmetY lysC (L377K) gltA (M312I) in which a nucleotide mutation was introduced into the gltA gene on the chromosome was obtained through a secondary crossover process. The introduction of the gltA gene mutation into the finally transformed strain was confirmed by performing PCR using the primers of SEQ ID NO: 7 and SEQ ID NO: 8, and then analyzing the base sequence, thereby confirming that the mutation was introduced into the strain.

In order to compare the O-acetylhomoserine-producing ability of the Corynebacterium glutamicum ATCC13032 ΔmetB ΔmetY lysC (L377K) and ATCC13032 ΔmetB ΔmetY lysC (L377K) gltA(M312I) strains constructed above, the strains were cultured by the method described above and O-acetyl homoserine was analyzed in the culture medium.

The strains were inoculated into a 250 mL corner-baffle flask containing 25 mL of the following medium (inoculation loop), and cultured with shaking at 200 rpm at 37° C. for 20 hours. The O-acetyl homoserine concentration was analyzed using HPLC, and the analyzed concentration was shown in Table 15 below.

L-O-Acetylhomoserine Production Medium (pH 7.2)

Glucose 30 g, $KH_2PO_4$ 2 g, Urea 3 g, $(NH_4)_2SO_4$ 40 g, Peptone 2.5 g, CSL (Sigma) 5 g (10 mL), $MgSO_4.7H_2O$ 0.5 g, Methionine 400 mg, $CaCO_3$ 20 g (based on 1 L of distilled water)

TABLE 15

| Name of Strains | O-AH (g/L) |
|---|---|
| ATCC13032 ΔmetB ΔmetY lysC(L377K) | 0.70 |
| ATCC13032 ΔmetB ΔmetY lysC(L377K) gltA(M312I) | 0.92 |

As shown in the results of Table 15, it was confirmed that the ATCC13032 ΔmetB ΔmetY lysC(L377K) gltA(M312I) strain introduced with the gltA(M312I) mutation improved O-acetyl-L-homoserine-producing ability by 31% as compared to the ATCC13032 ΔmetB ΔmetY lysC(L377K) strain.

Through the above results, it can be confirmed that the 312th amino acid in the amino acid sequence of gltA, which is citrate synthase, is an important position for gltA enzyme activity.

Those ordinary skill in the art will recognize that the present disclosure may be embodied in other specific forms without departing from its spirit or essential characteristics. In this regard, the described embodiments are to be considered in all respects only as illustrative and not restrictive. The scope of the present disclosure is therefore indicated by the appended claims rather than by the foregoing description. All changes which come within the meaning and range of equivaleny of the claims are to be embraced within the scope of the present disclosure.

The invention claimed is:

1. A modified polypeptide having citrate synthase activity, wherein the amino acid corresponding to the 312$^{th}$ position from the N-terminus of the amino acid sequence of SEQ ID NO: 1 is substituted with alanine, arginine, asparagine, aspartic acid, cysteine, glutamic acid, glutamine, glycine, histidine, isoleucine, leucine, lysine, phenylalanine, proline, serine, threonine, tryptophan, tyrosine or valine, wherein the amino acid sequence of the modified polypeptide shares at least 80% but less than 100% sequence identity with the amino acid sequence of SEQ ID NO: 1.

2. The modified polypeptide of claim 1, wherein the modified polypeptide comprisesis the amino acid sequence of SEQ ID NO: 3.

3. A polynucleotide comprising a nucleotide sequence encoding the modified polypeptide of claim 1.

4. A vector comprising the polynucleotide of claim 3.

5. A microorganism producing an L-amino acid, comprising the modified polypeptide of claim 1, a polynucleotide comprising a nucleotide sequence encoding the modified polypeptide, or a vector comprising the polynucleotide.

6. The microorganism of claim 5, wherein the L-amino acid is selected from the group consisting of leucine, lysine, valine, isoleucine, and O-acetyl homoserine, and combinations thereof.

7. The microorganism of claim 5, wherein the microorganism is a microorganism of the genus *Corynebacterium*.

8. The microorganism of claim 7, wherein the microorganism of the genus *Corynebacterium* is *Corynebacterium glutamicum*.

9. A method for producing an L-amino acid, comprising: culturing a microorganism in a medium to thereby produce the L-amino acid, wherein the microorganism comprises the modified polypeptide of claim 1, a polynucleotide comprising a nucleotide sequence encoding the modified polypeptide, or a vector comprising the polynucleotide.

10. The method of claim 9, wherein the method further comprises recovering the L-amino acid from the cultured medium or microorganism.

11. The method of claim 10, wherein the L-amino acid is selected from the group consisting of leucine, lysine, valine, isoleucine, and O-acetyl homoserine, and combinations thereof.

* * * * *

SEQUENCE LISTING

<160> NUMBER OF SEQ ID NOS: 37

<210> SEQ ID NO 1
<211> LENGTH: 437
<212> TYPE: PRT
<213> ORGANISM: Unknown
<220> FEATURE:
<223> OTHER INFORMATION: gltA AA - modified polypeptide having citrate
      synthase activity

<400> SEQUENCE: 1

Met Phe Glu Arg Asp Ile Val Ala Thr Asp Asn Asn Lys Ala Val Leu
1               5                   10                  15

His Tyr Pro Gly Gly Glu Phe Glu Met Asp Ile Ile Glu Ala Ser Glu
            20                  25                  30

Gly Asn Asn Gly Val Val Leu Gly Lys Met Leu Ser Glu Thr Gly Leu
        35                  40                  45

Ile Thr Phe Asp Pro Gly Tyr Val Ser Thr Gly Ser Thr Glu Ser Lys
50                  55                  60

Ile Thr Tyr Ile Asp Gly Asp Ala Gly Ile Leu Arg Tyr Arg Gly Tyr
65                  70                  75                  80

Asp Ile Ala Asp Leu Ala Glu Asn Ala Thr Phe Asn Glu Val Ser Tyr
                85                  90                  95

Leu Leu Ile Asn Gly Glu Leu Pro Thr Pro Asp Glu Leu His Lys Phe
            100                 105                 110

Asn Asp Glu Ile Arg His His Thr Leu Leu Asp Glu Asp Phe Lys Ser
        115                 120                 125

Gln Phe Asn Val Phe Pro Arg Asp Ala His Pro Met Ala Thr Leu Ala
130                 135                 140

Ser Ser Val Asn Ile Leu Ser Thr Tyr Tyr Gln Asp Gln Leu Asn Pro
145                 150                 155                 160

Leu Asp Glu Ala Gln Leu Asp Lys Ala Thr Val Arg Leu Met Ala Lys
                165                 170                 175

Val Pro Met Leu Ala Ala Tyr Ala His Arg Ala Arg Lys Gly Ala Pro
            180                 185                 190

Tyr Met Tyr Pro Asp Asn Ser Leu Asn Ala Arg Glu Asn Phe Leu Arg
        195                 200                 205

Met Met Phe Gly Tyr Pro Thr Glu Pro Tyr Glu Ile Asp Pro Ile Met
210                 215                 220

Val Lys Ala Leu Asp Lys Leu Leu Ile Leu His Ala Asp His Glu Gln
225                 230                 235                 240

Asn Cys Ser Thr Ser Thr Val Arg Met Ile Gly Ser Ala Gln Ala Asn
                245                 250                 255

Met Phe Val Ser Ile Ala Gly Gly Ile Asn Ala Leu Ser Gly Pro Leu
            260                 265                 270

His Gly Gly Ala Asn Gln Ala Val Leu Glu Met Leu Glu Asp Ile Lys
        275                 280                 285

Ser Asn His Gly Gly Asp Ala Thr Glu Phe Met Asn Lys Val Lys Asn
290                 295                 300

Lys Glu Asp Gly Val Arg Leu Met Gly Phe Gly His Arg Val Tyr Lys
305                 310                 315                 320

Asn Tyr Asp Pro Arg Ala Ala Ile Val Lys Glu Thr Ala His Glu Ile
                325                 330                 335

Leu Glu His Leu Gly Gly Asp Asp Leu Leu Asp Leu Ala Ile Lys Leu
            340                 345                 350

Glu Glu Ile Ala Leu Ala Asp Asp Tyr Phe Ile Ser Arg Lys Leu Tyr
            355                 360                 365

Pro Asn Val Asp Phe Tyr Thr Gly Leu Ile Tyr Arg Ala Met Gly Phe
        370                 375                 380

Pro Thr Asp Phe Phe Thr Val Leu Phe Ala Ile Gly Arg Leu Pro Gly
385                 390                 395                 400

Trp Ile Ala His Tyr Arg Glu Gln Leu Gly Ala Ala Gly Asn Lys Ile
                405                 410                 415

Asn Arg Pro Arg Gln Val Tyr Thr Gly Asn Glu Ser Arg Lys Leu Val
            420                 425                 430

Pro Arg Glu Glu Arg
        435

<210> SEQ ID NO 2
<211> LENGTH: 1314
<212> TYPE: DNA
<213> ORGANISM: Unknown
<220> FEATURE:
<223> OTHER INFORMATION: gltA NT - modified polynucleotide having citrate synthase activity

<400> SEQUENCE: 2 atgttttgaaa gggatatcgt ggctactgat aacaacaagg ctgtcctgca ctaccccggt      60
ggcgagttcg aaatggacat catcgaggct tctgagggta acaacggtgt tgtcctgggc     120
aagatgctgt ctgagactgg actgatcact tttgacccag ttatgtgag cactggctcc     180 accgagtcga agatcaccta catcgatggc gatgcgggaa tcctgcgtta ccgcggctat     240
gacatcgctg atctggctga aatgccacc ttcaacgagg tttcttacct acttatcaac     300
ggtgagctac caaccccaga tgagcttcac aagtttaacg acgagattcg ccaccacacc     360
cttctggacg aggacttcaa gtcccagttc aacgtgttcc cacgcgacgc tcacccaatg     420
gcaaccttgg cttcctcggt taacattttg tctacctact accaggacca gctgaaccca     480
ctcgatgagg cacagcttga taaggcaacc gttcgcctca tggcaaaggt tccaatgctg     540
gctgcgtacg cacaccgcgc acgcaagggt gctccttaca tgtacccaga caactccctc     600
aatgcgcgtg agaacttcct gcgcatgatg ttcggttacc caaccgagcc atacgagatc     660
gacccaatca tggtcaaggc tctggacaag ctgctcatcc tgcacgctga ccacgagcag     720
aactgctcca cctccaccgt tcgtatgatc ggttccgcac aggccaacat gtttgtctcc     780
atcgctggtg gcatcaacgc tctgtccggc ccactgcacg gtggcgcaaa ccaggctgtt     840
ctggagatgc tcgaagacat caagagcaac acggtggcg acgcaaccga gttcatgaac     900
aaggtcaaga acaaggaaga cggcgtccgc tcatgggct tcggacaccg cgtttacaag     960
aactacgatc cacgtgcagc aatcgtcaag gagaccgcac acgagatcct cgagcacctc    1020
ggtggcgacg atcttctgga tctggcaatc aagctggaag aaattgcact ggctgatgat    1080
tacttcatct cccgcaagct ctaccccgaa cgtagacttct acaccggcct gatctaccgc    1140
gcaatgggct tcccaactga cttcttcacc gtattgttcg caatcggtcg tctgccagga    1200
tggatcgctc actaccgcga gcagctcggt gcagcaggca acaagatcaa ccgcccacgc    1260
caggtctaca ccggcaacga atcccgcaag ttggttcctc gcgaggagcg ctaa          1314

<210> SEQ ID NO 3
<211> LENGTH: 437
<212> TYPE: PRT
<213> ORGANISM: Artificial Sequence
<220> FEATURE:

<223> OTHER INFORMATION: gltA M312I AA - modified polypeptide

<400> SEQUENCE: 3

| | | | | | | | | | | | | | | |
|---|---|---|---|---|---|---|---|---|---|---|---|---|---|---|
| Met | Phe | Glu | Arg | Asp | Ile | Val | Ala | Thr | Asp | Asn | Asn | Lys | Ala | Val | Leu |
| 1 | | | | 5 | | | | | 10 | | | | | 15 | |
| His | Tyr | Pro | Gly | Gly | Glu | Phe | Glu | Met | Asp | Ile | Ile | Glu | Ala | Ser | Glu |
| | | | 20 | | | | | 25 | | | | | 30 | | |
| Gly | Asn | Asn | Gly | Val | Val | Leu | Gly | Lys | Met | Leu | Ser | Glu | Thr | Gly | Leu |
| | | 35 | | | | | 40 | | | | | 45 | | | |
| Ile | Thr | Phe | Asp | Pro | Gly | Tyr | Val | Ser | Thr | Gly | Ser | Thr | Glu | Ser | Lys |
| 50 | | | | | 55 | | | | | 60 | | | | | |
| Ile | Thr | Tyr | Ile | Asp | Gly | Asp | Ala | Gly | Ile | Leu | Arg | Tyr | Arg | Gly | Tyr |
| 65 | | | | 70 | | | | | 75 | | | | | 80 | |
| Asp | Ile | Ala | Asp | Leu | Ala | Glu | Asn | Ala | Thr | Phe | Asn | Glu | Val | Ser | Tyr |
| | | | | 85 | | | | | 90 | | | | | 95 | |
| Leu | Leu | Ile | Asn | Gly | Glu | Leu | Pro | Thr | Pro | Asp | Glu | Leu | His | Lys | Phe |
| | | | 100 | | | | | 105 | | | | | 110 | | |
| Asn | Asp | Glu | Ile | Arg | His | His | Thr | Leu | Leu | Asp | Glu | Asp | Phe | Lys | Ser |
| | | | 115 | | | | | 120 | | | | | 125 | | |
| Gln | Phe | Asn | Val | Phe | Pro | Arg | Asp | Ala | His | Pro | Met | Ala | Thr | Leu | Ala |
| | 130 | | | | | 135 | | | | | 140 | | | | |
| Ser | Ser | Val | Asn | Ile | Leu | Ser | Thr | Tyr | Tyr | Gln | Asp | Gln | Leu | Asn | Pro |
| 145 | | | | | 150 | | | | | 155 | | | | | 160 |
| Leu | Asp | Glu | Ala | Gln | Leu | Asp | Lys | Ala | Thr | Val | Arg | Leu | Met | Ala | Lys |
| | | | | 165 | | | | | 170 | | | | | 175 | |
| Val | Pro | Met | Leu | Ala | Ala | Tyr | Ala | His | Arg | Ala | Arg | Lys | Gly | Ala | Pro |
| | | | 180 | | | | | 185 | | | | | 190 | | |
| Tyr | Met | Tyr | Pro | Asp | Asn | Ser | Leu | Asn | Ala | Arg | Glu | Asn | Phe | Leu | Arg |
| | | 195 | | | | | 200 | | | | | 205 | | | |
| Met | Met | Phe | Gly | Tyr | Pro | Thr | Glu | Pro | Tyr | Glu | Ile | Asp | Pro | Ile | Met |
| 210 | | | | | 215 | | | | | 220 | | | | | |
| Val | Lys | Ala | Leu | Asp | Lys | Leu | Leu | Ile | Leu | His | Ala | Asp | His | Glu | Gln |
| 225 | | | | | 230 | | | | | 235 | | | | | 240 |
| Asn | Cys | Ser | Thr | Ser | Thr | Val | Arg | Met | Ile | Gly | Ser | Ala | Gln | Ala | Asn |
| | | | | 245 | | | | | 250 | | | | | 255 | |
| Met | Phe | Val | Ser | Ile | Ala | Gly | Gly | Ile | Asn | Ala | Leu | Ser | Gly | Pro | Leu |
| | | | 260 | | | | | 265 | | | | | 270 | | |
| His | Gly | Gly | Ala | Asn | Gln | Ala | Val | Leu | Glu | Met | Leu | Glu | Asp | Ile | Lys |
| | | 275 | | | | | 280 | | | | | 285 | | | |
| Ser | Asn | His | Gly | Gly | Asp | Ala | Thr | Glu | Phe | Met | Asn | Lys | Val | Lys | Asn |
| | 290 | | | | | 295 | | | | | 300 | | | | |
| Lys | Glu | Asp | Gly | Val | Arg | Leu | Ile | Gly | Phe | Gly | His | Arg | Val | Tyr | Lys |
| 305 | | | | | 310 | | | | | 315 | | | | | 320 |
| Asn | Tyr | Asp | Pro | Arg | Ala | Ala | Ile | Val | Lys | Glu | Thr | Ala | His | Glu | Ile |
| | | | | 325 | | | | | 330 | | | | | 335 | |
| Leu | Glu | His | Leu | Gly | Gly | Asp | Asp | Leu | Leu | Asp | Leu | Ala | Ile | Lys | Leu |
| | | | 340 | | | | | 345 | | | | | 350 | | |
| Glu | Glu | Ile | Ala | Leu | Ala | Asp | Asp | Tyr | Phe | Ile | Ser | Arg | Lys | Leu | Tyr |
| | | | | 355 | | | | | 360 | | | | | 365 | |
| Pro | Asn | Val | Asp | Phe | Tyr | Thr | Gly | Leu | Ile | Tyr | Arg | Ala | Met | Gly | Phe |
| | | 370 | | | | | 375 | | | | | 380 | | | |
| Pro | Thr | Asp | Phe | Phe | Thr | Val | Leu | Phe | Ala | Ile | Gly | Arg | Leu | Pro | Gly |
| 385 | | | | | 390 | | | | | 395 | | | | | 400 |

Trp Ile Ala His Tyr Arg Glu Gln Leu Gly Ala Ala Gly Asn Lys Ile
                405                 410                 415

Asn Arg Pro Arg Gln Val Tyr Thr Gly Asn Glu Ser Arg Lys Leu Val
        420                 425                 430

Pro Arg Glu Glu Arg
        435

<210> SEQ ID NO 4
<211> LENGTH: 1314
<212> TYPE: DNA
<213> ORGANISM: Artificial Sequence
<220> FEATURE:
<223> OTHER INFORMATION: gltA M312I NT - modified polynucleotide

<400> SEQUENCE: 4

| | | | | |
|---|---|---|---|---|
| atgtttgaaa | gggatatcgt | ggctactgat | aacaacaagg | ctgtcctgca ctaccccggt | 60 |
| ggcgagttcg | aaatggacat | catcgaggct | tctgagggta | caacggtgt tgtcctgggc | 120 |
| aagatgctgt | ctgagactgg | actgatcact | tttgacccag | gttatgtgag cactggctcc | 180 |
| accgagtcga | agatcaccta | catcgatggc | gatgcgggaa | tcctgcgtta ccgcggctat | 240 |
| gacatcgctg | atctggctga | aatgccacc | ttcaacgagg | tttcttacct acttatcaac | 300 |
| ggtgagctac | caaccccaga | tgagcttcac | aagtttaacg | acgagattcg ccaccacacc | 360 |
| cttctggacg | aggacttcaa | gtcccagttc | aacgtgttcc | cacgcgacgc tcacccaatg | 420 |
| gcaaccttgg | cttcctcggt | taacattttg | tctacctact | accaggacca gctgaaccca | 480 |
| ctcgatgagg | cacagcttga | taaggcaacc | gttcgcctca | tggcaaaggt tccaatgctg | 540 |
| gctgcgtacg | cacaccgcgc | acgcaagggt | gctccttaca | tgtacccaga caactccctc | 600 |
| aatgcgcgtg | agaacttcct | gcgcatgatg | ttcggttacc | caaccgagcc atacgagatc | 660 |
| gacccaatca | tggtcaaggc | tctggacaag | ctgctcatcc | tgcacgctga ccacgagcag | 720 |
| aactgctcca | cctccaccgt | tcgtatgatc | ggttccgcac | aggccaacat gtttgtctcc | 780 |
| atcgctggtg | gcatcaacgc | tctgtccggc | ccactgcacg | gtggcgcaaa ccaggctgtt | 840 |
| ctggagatgc | tcgaagacat | caagagcaac | cacggtggcg | acgcaaccga gttcatgaac | 900 |
| aaggtcaaga | acaaggaaga | cggcgtccgc | ctcatcggct | tcggacaccg cgtttacaag | 960 |
| aactacgatc | cacgtgcagc | aatcgtcaag | gagaccgcac | acgagatcct cgagcacctc | 1020 |
| ggtggcgacg | atcttctgga | tctggcaatc | aagctggaag | aaattgcact ggctgatgat | 1080 |
| tacttcatct | cccgcaagct | ctacccgaac | gtagacttct | acaccggcct gatctaccgc | 1140 |
| gcaatgggct | tcccaactga | cttcttcacc | gtattgttcg | caatcggtcg tctgccagga | 1200 |
| tggatcgctc | actaccgcga | gcagctcggt | gcagcaggca | acaagatcaa ccgcccacgc | 1260 |
| caggtctaca | ccggcaacga | atcccgcaag | ttggttcctc | gcgaggagcg ctaa | 1314 |

<210> SEQ ID NO 5
<211> LENGTH: 30
<212> TYPE: DNA
<213> ORGANISM: Artificial Sequence
<220> FEATURE:
<223> OTHER INFORMATION: pCR-gltA F primer sequence

<400> SEQUENCE: 5
ctaatctcga ggtcacccat gtttgaaagg                                      30

<210> SEQ ID NO 6
<211> LENGTH: 27
<212> TYPE: DNA

```
<213> ORGANISM: Artificial Sequence
<220> FEATURE:
<223> OTHER INFORMATION: pCR-gltA R primer sequence

<400> SEQUENCE: 6
tcgcgaggag cgctaaaacc ggttgat                                          27

<210> SEQ ID NO 7
<211> LENGTH: 19
<212> TYPE: DNA
<213> ORGANISM: Artificial Sequence
<220> FEATURE:
<223> OTHER INFORMATION: gltA F primer sequence

<400> SEQUENCE: 7
caatgctggc tgcgtacgc                                                   19

<210> SEQ ID NO 8
<211> LENGTH: 20
<212> TYPE: DNA
<213> ORGANISM: Artificial Sequence
<220> FEATURE:
<223> OTHER INFORMATION: gltA R primer sequence

<400> SEQUENCE: 8
ctcctcgcga ggaaccaact                                                  20

<210> SEQ ID NO 9
<211> LENGTH: 42
<212> TYPE: DNA
<213> ORGANISM: Artificial Sequence
<220> FEATURE:
<223> OTHER INFORMATION: gltA M312I Up F primer sequence

<400> SEQUENCE: 9
gtgaattcga gctcggtacc cgcgggaatc ctgcgttacc gc                         42

<210> SEQ ID NO 10
<211> LENGTH: 42
<212> TYPE: DNA
<213> ORGANISM: Artificial Sequence
<220> FEATURE:
<223> OTHER INFORMATION: gltA M312I Up R primer sequence

<400> SEQUENCE: 10
tgtaaacgcg gtgtccgaag ccgatgaggc ggacgccgtc tt                         42

<210> SEQ ID NO 11
<211> LENGTH: 42
<212> TYPE: DNA
<213> ORGANISM: Artificial Sequence
<220> FEATURE:
<223> OTHER INFORMATION: gltA M312I Down F primer sequence

<400> SEQUENCE: 11
aagacggcgt ccgcctcatc ggcttcggac accgcgttta ca                         42

<210> SEQ ID NO 12
<211> LENGTH: 42
<212> TYPE: DNA
<213> ORGANISM: Artificial Sequence
<220> FEATURE:
<223> OTHER INFORMATION: gltA M312I Down R primer sequence

<400> SEQUENCE: 12
ggtcgactct agaggatccc cttagcgctc ctcgcgagga ac                         42
```

<210> SEQ ID NO 13
<211> LENGTH: 39
<212> TYPE: DNA
<213> ORGANISM: Artificial Sequence
<220> FEATURE:
<223> OTHER INFORMATION: leuA F primer sequence

<400> SEQUENCE: 13
accgaaattg gcttgggtgc cagcccagct gatgcctac           39

<210> SEQ ID NO 14
<211> LENGTH: 42
<212> TYPE: DNA
<213> ORGANISM: Artificial Sequence
<220> FEATURE:
<223> OTHER INFORMATION: leuA R primer sequence

<400> SEQUENCE: 14
aagcttgcat gcctgcagct taaagtcacc tacgttttgt ac       42

<210> SEQ ID NO 15
<211> LENGTH: 29
<212> TYPE: DNA
<213> ORGANISM: Artificial Sequence
<220> FEATURE:
<223> OTHER INFORMATION: lysC up F primer sequence

<400> SEQUENCE: 15
tcctctagag ctgcgcagtg ttgaatacg                      29

<210> SEQ ID NO 16
<211> LENGTH: 30
<212> TYPE: DNA
<213> ORGANISM: Artificial Sequence
<220> FEATURE:
<223> OTHER INFORMATION: lysC up R primer sequence

<400> SEQUENCE: 16
tggaaatctt ttcgatgttc acgttgacat                     30

<210> SEQ ID NO 17
<211> LENGTH: 30
<212> TYPE: DNA
<213> ORGANISM: Artificial Sequence
<220> FEATURE:
<223> OTHER INFORMATION: lysC down F primer sequence

<400> SEQUENCE: 17
acatcgaaaa gatttccacc tctgagattc                     30

<210> SEQ ID NO 18
<211> LENGTH: 29
<212> TYPE: DNA
<213> ORGANISM: Artificial Sequence
<220> FEATURE:
<223> OTHER INFORMATION: lysC down R primer sequence

<400> SEQUENCE: 18
gactctagag ttcacctcag agacgatta                      29

<210> SEQ ID NO 19
<211> LENGTH: 29
<212> TYPE: DNA
<213> ORGANISM: Artificial Sequence
<220> FEATURE:

<223> OTHER INFORMATION: hom up F primer sequence

<400> SEQUENCE: 19
tcctctagac tggtcgcctg atgttctac          29

<210> SEQ ID NO 20
<211> LENGTH: 23
<212> TYPE: DNA
<213> ORGANISM: Artificial Sequence
<220> FEATURE:
<223> OTHER INFORMATION: hom up R primer sequence

<400> SEQUENCE: 20
cacgatcaga tgtgcatcat cat          23

<210> SEQ ID NO 21
<211> LENGTH: 23
<212> TYPE: DNA
<213> ORGANISM: Artificial Sequence
<220> FEATURE:
<223> OTHER INFORMATION: hom down F primer sequence

<400> SEQUENCE: 21
atgatgatgc acatctgatc gtg          23

<210> SEQ ID NO 22
<211> LENGTH: 29
<212> TYPE: DNA
<213> ORGANISM: Artificial Sequence
<220> FEATURE:
<223> OTHER INFORMATION: hom down R primer sequence

<400> SEQUENCE: 22
gactctagat tagtcccttt cgaggcgga          29

<210> SEQ ID NO 23
<211> LENGTH: 28
<212> TYPE: DNA
<213> ORGANISM: Artificial Sequence
<220> FEATURE:
<223> OTHER INFORMATION: ilvA V323A up F primer sequence

<400> SEQUENCE: 23
acggatccca gactccaaag caaaagcg          28

<210> SEQ ID NO 24
<211> LENGTH: 30
<212> TYPE: DNA
<213> ORGANISM: Artificial Sequence
<220> FEATURE:
<223> OTHER INFORMATION: ilvA V323A up R primer sequence

<400> SEQUENCE: 24
acaccacggc agaaccaggt gcaaaggaca          30

<210> SEQ ID NO 25
<211> LENGTH: 30
<212> TYPE: DNA
<213> ORGANISM: Artificial Sequence
<220> FEATURE:
<223> OTHER INFORMATION: ilvA V323A down F primer sequence

<400> SEQUENCE: 25
ctggttctgc cgtggtgtgc atcatctctg          30

```
<210> SEQ ID NO 26
<211> LENGTH: 28
<212> TYPE: DNA
<213> ORGANISM: Artificial Sequence
<220> FEATURE:
<223> OTHER INFORMATION: ilvA V323A down R primer sequence

<400> SEQUENCE: 26
acggatccaa ccaaacttgc tcacactc                                           28

<210> SEQ ID NO 27
<211> LENGTH: 1161
<212> TYPE: DNA
<213> ORGANISM: Unknown
<220> FEATURE:
<223> OTHER INFORMATION: Corynebacterium glutamicum metB

<400> SEQUENCE: 27
ttgtcttttg acccaaacac ccagggtttc tccactgcat cgattcacgc tgggtatgag        60
ccagacgact actacggttc gattaacacc ccaatctatg cctccaccac cttcgcgcag       120
aacgctccaa acgaactgcg caaaggctac gagtacaccc gtgtgggcaa ccccaccatc       180
gtggcattag agcagaccgt cgcagcactc gaaggcgcaa agtatggccg cgcattctcc       240
tccggcatgg ctgcaaccga catcctgttc cgcatcatcc tcaagccggg cgatcacatc       300
gtcctcggca acgatgctta cggcggaacc taccgcctga tcgacaccgt attcaccgca       360
tggggcgtcg aatacaccgt tgttgatacc tccgtcgtgg aagaggtcaa ggcagcgatc       420
aaggacaaca ccaagctgat ctgggtggaa accccaacca cccagcact tggcatcacc        480 gacatcgaag cagtagcaaa gctcaccgaa ggcaccaacg ccaagctggt tgttgacaac       540
accttcgcat ccccatacct gcagcagcca ctaaaactcg gcgcacacgc agtcctgcac       600
tccaccacca gtacatcgg aggacactcc gacgttgttg gcggccttgt ggttaccaac       660
gaccaggaaa tggacgaaga actgctgttc atgcagggcg gcatcggacc gatcccatca       720
gttttcgatg catacctgac cgcccgtggc ctcaagaccc ttgcagtgcg catggatcgc       780
cactgcgaca acgcagaaaa gatcgcggaa ttcctggact cccgcccaga ggtctccacc       840
gtgctctacc caggtctgaa gaaccaccca ggccacgaag tcgcagcgaa gcagatgaag       900
cgcttcggcg gcatgatctc cgtccgtttc gcaggcggcg aagaagcagc taagaagttc       960
tgtacctcca ccaaactgat ctgtctggcc gagtccctcg gtggcgtgga atccctcctg      1020
gagcacccag caaccatgac ccaccagtca gctgccggct ctcagctcga ggttccccgc      1080
gacctcgtgc gcatctccat tggtattgaa gacattgaag acctgctcgc agatgtcgag      1140
caggccctca ataacctttta g                                               1161

<210> SEQ ID NO 28
<211> LENGTH: 24
<212> TYPE: DNA
<213> ORGANISM: Artificial Sequence
<220> FEATURE:
<223> OTHER INFORMATION: metB_N_del F primer sequence

<400> SEQUENCE: 28
tctagacgcc cgcatactgg cttc                                               24

<210> SEQ ID NO 29
<211> LENGTH: 37
<212> TYPE: DNA
<213> ORGANISM: Artificial Sequence
<220> FEATURE:
```

<223> OTHER INFORMATION: metB_N_del R primer sequence

<400> SEQUENCE: 29
cccatccact aaacttaaac agatgtgatc gcccggc                37

<210> SEQ ID NO 30
<211> LENGTH: 38
<212> TYPE: DNA
<213> ORGANISM: Artificial Sequence
<220> FEATURE:
<223> OTHER INFORMATION: metB_C_del F primer sequence

<400> SEQUENCE: 30
tgtttaagtt tagtggatgg ggaagaacca cccaggcc                38

<210> SEQ ID NO 31
<211> LENGTH: 23
<212> TYPE: DNA
<213> ORGANISM: Artificial sequence
<220> FEATURE:
<223> OTHER INFORMATION: metB_C_del R primer sequence

<400> SEQUENCE: 31
gtcgaccaat cgtccagagg gcg                23

<210> SEQ ID NO 32
<211> LENGTH: 1314
<212> TYPE: DNA
<213> ORGANISM: Unknown
<220> FEATURE:
<223> OTHER INFORMATION: Corynebacterium glutamicum metY

<400> SEQUENCE: 32
atgccaaagt acgacaattc caatgctgac cagtggggct tgaaacccg ctccattcac        60
gcaggccagt cagtagacgc acagaccagc gcacgaaacc ttccgatcta ccaatccacc      120
gctttcgtgt tcgactccgc tgagcacgcc aagcagcgtt tcgcacttga ggatctaggc      180
cctgtttact cccgcctcac caacccaacc gttgaggctt tggaaaaccg catcgcttcc      240
ctcgaaggtg gcgtccacgc tgtagcgttc tcctccggac aggccgcaac caccaacgcc      300
attttgaacc tggcaggagc gggcgaccac atcgtcacct ccccacgcct ctacggtggc      360
accgagactc tattccttat cactcttaac cgcctgggta tcgatgtttc cttcgtggaa      420
aaccccgacg accctgagtc ctggcaggca gccgttcagc aaacaccaa agcattcttc      480
ggcgagactt cgccaacccc acaggcagac gtcctggata ttcctgcggt ggctgaagtt      540
gcgcaccgca acagcgttcc actgatcatc gacaacacca tcgctaccgc agcgctcgtg      600
cgcccgctcg agctcggcgc agacgttgtc gtcgcttccc tcaccaagtt ctacaccggc      660
aacggctccg gactgggcgg cgtgcttatc gacggcggaa agttcgattg gactgtcgaa      720
aaggatggaa agccagtatt ccctacttc gtcactccag atgctgctta ccacggattg      780
aagtacgcag accttggtgc accagccttc ggcctcaagg ttcgcgttgg ccttctacgc      840
gacaccggct ccaccctctc cgcattcaac gcatgggctg cagtccaggg catcgacacc      900
cttttccctgc gcctggagcg ccacaacgaa aacgccatca ggttgcagaa attcctcaac      960
aaccacgaga aggtggaaaa ggttaacttc gcaggcctga aggattcccc ttggtacgca    1020
accaaggaaa agcttggcct gaagtacacc ggctccgttc tcaccttcga gatcaagggc    1080
ggcaaggatg aggcttgggc atttatcgac gccctgaagc tacactccaa ccttgcaaac    1140
atcggcgatg ttcgctccct cgttgttcac ccagcaacca ccacccattc acagtccgac    1200

```
gaagctggcc tggcacgcgc gggcgttacc cagtccaccg tccgcctgtc cgttggcatc    1260
gagaccattg atgatatcat cgctgacctc gaaggcggct ttgctgcaat ctag          1314

<210> SEQ ID NO 33
<211> LENGTH: 24
<212> TYPE: DNA
<213> ORGANISM: Artificial Sequence
<220> FEATURE:
<223> OTHER INFORMATION: metY_N_del F primer sequence

<400> SEQUENCE: 33
tctagaccat cctgcaccat ttag                                             24

<210> SEQ ID NO 34
<211> LENGTH: 37
<212> TYPE: DNA
<213> ORGANISM: Artificial Sequence
<220> FEATURE:
<223> OTHER INFORMATION: metY_N_del R primer sequence

<400> SEQUENCE: 34
cccatccact aaacttaaac acgctcctgc caggttc                               37

<210> SEQ ID NO 35
<211> LENGTH: 39
<212> TYPE: DNA
<213> ORGANISM: Artificial Sequence
<220> FEATURE:
<223> OTHER INFORMATION: metY_C_del F primer sequence

<400> SEQUENCE: 35
tgtttaagtt tagtggatgg gcttggtacg caaccaagg                             39

<210> SEQ ID NO 36
<211> LENGTH: 23
<212> TYPE: DNA
<213> ORGANISM: Artificial Sequence
<220> FEATURE:
<223> OTHER INFORMATION: metY_C_del R primer sequence

<400> SEQUENCE: 36
gtcgacgatt gctccggctt cgg                                              23

<210> SEQ ID NO 37
<211> LENGTH: 1266
<212> TYPE: DNA
<213> ORGANISM: Unknown
<220> FEATURE:
<223> OTHER INFORMATION: Corynebacterium glutamicum lysC

<400> SEQUENCE: 37
gtggccctgg tcgtacagaa atatggcggt tcctcgcttg agagtgcgga acgcattaga     60
aacgtcgctg aacggatcgt tgccaccaag aaggctggaa atgatgtcgt ggttgtctgc    120
tccgcaatgg agacaccac ggatgaactt ctagaacttg cagcggcagt gaatcccgtt     180
ccgccagctc gtgaaatgga tatgctcctg actgctggtg agcgtatttc taacgctctc    240
gtcgccatgg ctattgagtc ccttggcgca gaagcccaat ctttcacggg ctctcaggct    300
ggtgtgctca ccaccgagcg ccacggaaac gcacgcattg ttgatgtcac tccaggtcgt    360
gtgcgtgaag cactcgatga gggcaagatc tgcattgttg ctggtttcca gggtgttaat    420
aaagaaaccc gcgatgtcac cacgttgggt cgtggtggtt ctgacaccac tgcagttgcg    480
```

-continued

```
ttggcagctg ctttgaacgc tgatgtgtgt gagatttact cggacgttga cggtgtgtat    540
accgctgacc cgcgcatcgt tcctaatgca cagaagctgg aaaagctcag cttcgaagaa    600
atgctggaac ttgctgctgt tggctccaag attttggtgc tgcgcagtgt tgaatacgct    660
cgtgcattca atgtgccact tcgcgtacgc tcgtcttata gtaatgatcc cggcactttg    720
attgccggct ctatggagga tattcctgtg gaagaagcag tccttaccgg tgtcgcaacc    780
gacaagtccg aagccaaagt aaccgttctg ggtatttccg ataagccagg cgaggctgcg    840
aaggttttcc gtgcgttggc tgatgcagaa atcaacattg acatggttct gcagaacgtc    900
tcttctgtag aagacggcac caccgacatc accttcacct gccctcgttc cgacggccgc    960
cgcgcgatgg agatcttgaa gaagcttcag gttcagggca actggaccaa tgtgctttac   1020
gacgaccagg tcggcaaagt ctccctcgtg ggtgctggca tgaagtctca cccaggtgtt   1080
accgcagagt tcatggaagc tctgcgcgat gtcaacgtga acatcgaatt gatttccacc   1140
tctgagattc gtatttccgt gctgatccgt gaagatgatc tggatgctgc tgcacgtgca   1200
ttgcatgagc agttccagct gggcggcgaa gacgaagccg tcgtttatgc aggcaccgga   1260
cgctaa                                                              1266
```